(12) United States Patent
Chen et al.

(10) Patent No.: US 12,526,026 B2
(45) Date of Patent: Jan. 13, 2026

(54) CHANNEL MATRIX DETERMINING METHOD, APPARATUS, AND SYSTEM

(71) Applicant: HUAWEI TECHNOLOGIES CO., LTD., Guangdong (CN)

(72) Inventors: Ying Chen, Hangzhou (CN); Jianwei Zhou, Hangzhou (CN); Hejia Luo, Hangzhou (CN); Yu Wang, Hangzhou (CN); Jun Wang, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 343 days.

(21) Appl. No.: 18/315,431

(22) Filed: May 10, 2023

(65) Prior Publication Data

US 2023/0283350 A1 Sep. 7, 2023

Related U.S. Application Data

(63) Continuation of application No. PCT/CN2021/121864, filed on Sep. 29, 2021.

(30) Foreign Application Priority Data

Nov. 23, 2020 (CN) .......................... 202011321495.X

(51) Int. Cl.
*H04B 7/06* (2006.01)
*H04B 17/318* (2015.01)
*H04L 5/00* (2006.01)

(52) U.S. Cl.
CPC ......... *H04B 7/0639* (2013.01); *H04B 17/328* (2023.05); *H04L 5/0051* (2013.01)

(58) Field of Classification Search
CPC .... H04B 7/0639; H04B 17/328; H04L 5/0051
See application file for complete search history.

(56) References Cited

U.S. PATENT DOCUMENTS

| 2019/0081669 A1* | 3/2019 | Wu | ...................... H04B 7/0452 |
| 2019/0081680 A1* | 3/2019 | Wu | ...................... H04B 7/0639 |

FOREIGN PATENT DOCUMENTS

| CN | 105119642 A | 12/2015 |
| CN | 107733549 A | 2/2018 |
| CN | 111866938 A | 10/2020 |
| WO | 2019019839 A1 | 1/2019 |
| WO | 2020221582 A1 | 11/2020 |

* cited by examiner

*Primary Examiner* — Noel R Beharry
(74) *Attorney, Agent, or Firm* — WOMBLE BOND DICKINSON (US) LLP

(57) ABSTRACT

Embodiments of this application provide a channel matrix determining method, an apparatus, and a system, relating to the field of communication technologies, to resolve a technical problem that a manner in which a network device determines a precoding matrix based on an existing PMI indicator is not applicable to long-distance communication. The method includes: A terminal device obtains a plurality of reference signals, determines a first channel matrix based on the plurality of reference signals, and feeds back, to a network device, first information indicating some channel elements in the first channel matrix. The terminal device may further receive a downlink signal determined based on the first information and sent by the network device. A channel element in the some channel elements is determined based on signal strength and/or a time-frequency resource of the reference signal.

11 Claims, 9 Drawing Sheets

CHANNEL MATRIX DETERMINING METHOD, APPARATUS, AND SYSTEM

CROSS-REFERENCE TO RELATED APPLICATIONS

This application is a continuation of International Application No. PCT/CN2021/121864, filed on Sep. 29, 2021, which claims priority to Chinese Patent Application No. 202011321495.X, filed on Nov. 23, 2020. The disclosures of the aforementioned applications are hereby incorporated by reference in their entireties.

TECHNICAL FIELD

This application relates to the field of communications technologies, and in particular, to a channel matrix determining method, an apparatus, and a system.

BACKGROUND

In an existing communications system, when a network device sends a downlink signal to a terminal device, the network device may determine a precoding matrix based on a channel matrix corresponding to a downlink channel, perform precoding processing on the downlink signal based on the precoding matrix, and send the downlink signal to the terminal device. The terminal device may determine the precoding matrix based on the channel matrix corresponding to the downlink channel, and decode the received downlink signal based on the precoding matrix.

When uplink and downlink channels are reciprocal, the network device may consider that the downlink channel and the uplink channel have similar channel characteristics, and derive, based on an uplink reference signal, the channel matrix corresponding to the downlink channel, to determine the precoding matrix. When the uplink and downlink channels are not reciprocal, the network device may send a downlink reference signal to the terminal device. The terminal device may measure the downlink channel based on the downlink reference signal to obtain the channel matrix corresponding to the downlink channel, determine the precoding matrix, and feed back related information of the precoding matrix to the network device by using a precoding matrix indicator (PMI), so that the network device determines the related information of the precoding matrix based on the PMI indicator, to restore the precoding matrix.

However, in such a PMI indicator manner, a corresponding spatial beam direction is limited. When the uplink and downlink channels between the network device and the terminal device are not reciprocal, there may be an error between an actual beam direction determined based on the PMI indicator and an ideal beam direction. When there is an error between the actual beam direction and the ideal beam direction, for example, in a satellite communications scenario, as a communications distance between the terminal device and the network device increases, an error distance generated on ground becomes larger, thereby affecting communications quality of the terminal device. Therefore, such a manner in which the network device determines the precoding matrix based on the existing PMI indicator is not applicable to long-distance communication.

SUMMARY

In view of this, an objective of this application is to provide a channel matrix determining method, an apparatus, and a system, to resolve a technical problem that a manner in which a network device determines a precoding matrix based on an existing PMI indicator is not applicable to long-distance communication.

According to a first aspect, an embodiment of this application provides a channel matrix determining method. The method includes: A terminal device obtains a plurality of reference signals, determines a first channel matrix based on the plurality of reference signals, and feeds back, to a network device, first information indicating some channel elements in the first channel matrix. The terminal device may further receive a downlink signal determined based on the first information and sent by the network device. A channel element in the some channel elements is determined based on signal strength and/or a time-frequency resource of the reference signal.

Based on the first aspect, the terminal device feeds back limited channel elements by using the first information, so that the network device processes a first matrix based on the limited channel elements to obtain a second channel matrix, and feedback overheads can be reduced. In addition, because the network device determines the second channel matrix based on the channel elements fed back by the terminal device, an error between an actual beam direction and an ideal beam direction can be reduced, beam sweeping precision can be improved, and communications quality of long-distance communication can be improved.

In a possible design, the some channel elements include a first channel element corresponding to a first reference signal, and the first reference signal is a reference signal with maximum signal strength in the plurality of reference signals, or the first reference signal is a reference signal on a preset time-frequency resource.

Based on the possible design, the terminal device may select, from the first channel matrix based on signal strength and/or time-frequency resources, a channel element corresponding to a reference signal with higher signal strength and/or a channel element corresponding to a reference signal on a time-frequency resource that is the same as or close to a time-frequency resource of a wanted signal as the some channel elements. This can improve accuracy of the second channel matrix determined by the network device based on the some channel elements fed back by the terminal device, thereby improving accuracy of a precoding matrix determined by the network device based on the second channel matrix, and improving communications quality of a communications system.

In a possible design, the first information includes the some channel elements.

In a possible design, the first information includes a channel parameter corresponding to each of the some channel elements, so that the network device determines, based on the channel parameter, the channel element corresponding to the channel parameter.

Based on the foregoing two possible designs, the terminal device may directly feed back the channel element to the network device, so that the network device determines the second channel matrix based on the channel element. Alternatively, the terminal device may indicate the channel element by feeding back the channel parameter corresponding to the channel element, thereby reducing feedback overheads of the terminal device.

In a possible design, the first information includes a first coefficient corresponding to each second channel element and the first channel element, so that the network device determines, based on the first coefficient and the first channel element, the second channel element corresponding to the first coefficient.

In a possible design, the first information includes a first coefficient corresponding to each second channel element and a channel parameter of the first channel element, so that the network device determines the first channel element based on the channel parameter of the first channel element, and determines, based on the first coefficient and the first channel element, the second channel element corresponding to the first coefficient.

Based on the foregoing two possible designs, the terminal device feeds back the first information based on the channel element and the first coefficient, so that feedback overheads of the terminal device can be reduced.

In a possible design, the first information includes a channel coefficient, or the first information includes an indication parameter corresponding to the channel coefficient, so that the network device determines the second channel matrix based on the channel coefficient.

Based on the possible design, the terminal device feeds back the first information based on the channel coefficient, so that feedback overheads of the terminal device can be reduced.

In a possible design, the channel coefficient is a quotient of the first channel element and a first coupling loss corresponding to the first channel element, and the first coupling loss corresponds to the first reference signal.

In a possible design, the first coupling loss includes an antenna gain of a transmit end, an antenna gain of a receive end, and a free path pass loss; or the first coupling loss includes an antenna gain of a transmit end and a free path pass loss; or the first coupling loss includes a free path pass loss.

In a possible design, the channel coefficient is an average value of quotients of channel elements in the first channel matrix and coupling losses corresponding to the channel elements, and the channel element and the coupling loss corresponding to the channel element correspond to a same reference signal.

Based on the foregoing three possible designs, the terminal device may determine the channel coefficient by using any one of the designs. This provides feasible solutions for the terminal device to determine the channel coefficient.

In a possible design, the terminal device feeds back the first information to the network device in a feedback manner indicated by first indication information sent by the network device. The feedback manner includes one or more of the following: feeding back the first information based on a channel element, feeding back the first information based on a channel parameter of a channel element, feeding back the first information based on a channel element and a first coefficient, feeding back the first information based on a channel parameter of a channel element and a first coefficient, feeding back the first information based on a channel coefficient, or feeding back the first information based on an indication parameter of a channel coefficient.

Based on the possible design, the terminal device may feed back the first information to the network device in the feedback manner indicated by the network device, so that the terminal device and the network device determine the second channel matrix based on the first information in the same feedback manner, thereby improving accuracy of the second channel matrix determined by the network device, and improving communications quality of a communications system.

In a possible design, the terminal device determines the some channel elements based on the first channel matrix and the number of channel elements included in the some channel elements that is indicated by second indication information sent by the network device, and feeds back the first information to the network device based on the some channel elements.

Based on the possible design, the network device may determine, based on actual communications quality of the network device, the number of channel elements to be fed back by the terminal device, so that the terminal device feeds back the first information to the network device based on the number. This provides a feasible solution for the terminal device to feed back the first information.

In a possible design, the terminal device sends location information of the terminal device to the network device.

In a possible design, the terminal device determines, based on beam sweeping, a first beam with maximum signal strength in beams corresponding to the beam sweeping, and sends related information of the first beam to the network device, so that the terminal device and the network device determine the location information of the terminal device based on the first beam.

In a possible design, the related information of the first beam is one or more of the following: a beam identifier of the first beam, a timestamp of the first beam, and a time-frequency resource of the first beam.

Based on the foregoing three possible designs, when the terminal device has a positioning function, the terminal device may report the location information, so that the network device determines the location information of the terminal device. When the terminal device does not have a positioning function, or has a relatively poor positioning capability, or cannot report the location information, the terminal device and the network device may determine the location information of the terminal device in a beam sweeping manner. This provides feasible solutions for the terminal device and the network device to determine the location information of the terminal device.

According to a second aspect, an embodiment of this application provides a terminal device. The terminal device may implement functions performed by the terminal device in the first aspect or the possible designs of the first aspect, and the functions may be implemented by hardware executing corresponding software. The hardware or the software includes one or more modules corresponding to the functions, for example, a transceiver module and a processing module. The transceiver module is configured to obtain a plurality of reference signals. The processing module is configured to determine a first channel matrix based on the plurality of reference signals. The transceiver module is further configured to feed back, to a network device, first information indicating some channel elements in the first channel matrix. The transceiver module is further configured to receive a downlink signal determined based on the first information and sent by the network device. A channel element in the some channel elements is determined based on signal strength and/or a time-frequency resource of the reference signal.

For an implementation of the terminal device, refer to behaviors and functions of the terminal device in the channel matrix determining method provided in any one of the first aspect or the possible designs of the first aspect. Based on the terminal device in the second aspect, the terminal device feeds back limited channel elements by using the first information, so that the network device processes a first matrix based on the limited channel elements to obtain a second channel matrix, while feedback overheads can be reduced. In addition, because the network device determines the second channel matrix based on the channel elements fed back by the terminal device, an error between an actual beam direction and an ideal beam direction can be reduced, beam sweeping precision can be improved, and communications quality of long-distance communication can be improved.

In a possible design, the some channel elements include a first channel element corresponding to a first reference signal, and the first reference signal is a reference signal with maximum signal strength in the plurality of reference signals, or the first reference signal is a reference signal on a preset time-frequency resource.

Based on the possible design, the terminal device may select, from the first channel matrix based on signal strength and/or time-frequency resources, a channel element corresponding to a reference signal with higher signal strength and/or a channel element corresponding to a reference signal on a time-frequency resource that is the same as or close to a time-frequency resource of a wanted signal as the some channel elements. This can improve accuracy of the second channel matrix determined by the network device based on the some channel elements fed back by the terminal device, thereby improving accuracy of a precoding matrix determined by the network device based on the second channel matrix, and improving communications quality of a communications system.

In a possible design, the first information includes the some channel elements.

In a possible design, the first information includes a channel parameter corresponding to each of the some channel elements, so that the network device determines, based on the channel parameter, the channel element corresponding to the channel parameter.

Based on the foregoing two possible designs, the terminal device may directly feed back the channel element to the network device, so that the network device determines the second channel matrix based on the channel element. Alternatively, the terminal device may indicate the channel element by feeding back the channel parameter corresponding to the channel element, thereby reducing feedback overheads of the terminal device.

In a possible design, the first information includes a first coefficient corresponding to each second channel element and the first channel element, so that the network device determines, based on the first coefficient and the first channel element, the second channel element corresponding to the first coefficient.

In a possible design, the first information includes a first coefficient corresponding to each second channel element and a channel parameter of the first channel element, so that the network device determines the first channel element based on the channel parameter of the first channel element, and determines, based on the first coefficient and the first channel element, the second channel element corresponding to the first coefficient.

Based on the foregoing two possible designs, the terminal device feeds back the first information based on the channel element and the first coefficient, so that feedback overheads of the terminal device can be reduced.

In a possible design, the first information includes a channel coefficient, or the first information includes an indication parameter corresponding to the channel coefficient, so that the network device determines the second channel matrix based on the channel coefficient.

Based on the possible design, the terminal device feeds back the first information based on the channel coefficient, so that feedback overheads of the terminal device can be reduced.

In a possible design, the channel coefficient is a quotient of the first channel element and a first coupling loss corresponding to the first channel element, and the first coupling loss corresponds to the first reference signal.

In a possible design, the channel coefficient is an average value of quotients of channel elements in the first channel matrix and coupling losses corresponding to the channel elements, and the channel element and the coupling loss corresponding to the channel element correspond to a same reference signal.

Based on the foregoing two possible designs, the terminal device may determine the channel coefficient by using either of the designs. This provides feasible solutions for the terminal device to determine the channel coefficient.

In a possible design, the transceiver module is further configured to feed back the first information to the network device in a feedback manner indicated by first indication information sent by the network device. The feedback manner includes one or more of the following: feeding back the first information based on a channel element, feeding back the first information based on a channel parameter of a channel element, feeding back the first information based on a channel element and a first coefficient, feeding back the first information based on a channel parameter of a channel element and a first coefficient, feeding back the first information based on a channel coefficient, or feeding back the first information based on an indication parameter of a channel coefficient.

Based on the possible design, the terminal device may feed back the first information to the network device in the feedback manner indicated by the network device, so that the terminal device and the network device determine the second channel matrix based on the first information in the same feedback manner, thereby improving accuracy of the second channel matrix determined by the network device, and improving communications quality of a communications system.

In a possible design, the transceiver module is further configured to: determine the some channel elements based on the first channel matrix and the number of channel elements included in the some channel elements that is indicated by second indication information sent by the network device, and feed back the first information to the network device based on the some channel elements.

Based on the possible design, the network device may determine, based on actual communications quality of the network device, the number of channel elements to be fed back by the terminal device, so that the terminal device feeds back the first information to the network device based on the number. This provides a feasible solution for the terminal device to feed back the first information.

In a possible design, the transceiver module is further configured to send location information of the terminal device to the network device.

In a possible design, the processing module is further configured to determine, based on beam sweeping, a first beam with maximum signal strength in beams corresponding to the beam sweeping; and the transceiver module is further configured to send related information of the first beam to the network device, so that the terminal device and the network device determine the location information of the terminal device based on the first beam.

In a possible design, the related information of the first beam is one or more of the following: a beam identifier of the first beam, a timestamp of the first beam, and a time-frequency resource of the first beam.

Based on the foregoing three possible designs, when the terminal device has a positioning function, the terminal device may report the location information, so that the network device determines the location information of the terminal device. When the terminal device does not have a positioning function, or has a relatively poor positioning capability, or cannot report the location information, the terminal device and the network device may determine the location information of the terminal device in a beam sweeping manner. This provides feasible solutions for the terminal device and the network device to determine the location information of the terminal device.

According to a third aspect, an embodiment of this application provides a terminal device. The terminal device may be a terminal device or a chip or a system-on-a-chip in the terminal device. The terminal device may implement functions performed by the terminal device in the foregoing aspects or possible designs, and the functions may be implemented by hardware. In a possible design, the terminal device may include a transceiver and a processor. The transceiver and the processor may be configured to support the terminal device in implementing a function in any one of the first aspect or the possible designs of the first aspect. For example, the transceiver may be configured to obtain a plurality of reference signals. The processor may be configured to determine a first channel matrix based on the plurality of reference signals. The transceiver may be further configured to feed back, to a network device, first information indicating some channel elements in the first channel matrix. The transceiver may be further configured to receive a downlink signal determined based on the first information and sent by the network device. A channel element in the some channel elements is determined based on signal strength and/or a time-frequency resource of the reference signal. In another possible design, the terminal device may further include a memory. The memory is configured to store computer-executable instructions and data for the terminal device. When the terminal device runs, the transceiver and the processor execute the computer-executable instructions stored in the memory, to enable the terminal device to perform the channel matrix determining method according to any one of the first aspect or the possible designs of the first aspect.

For an implementation of the terminal device in the third aspect, refer to behaviors and functions of the terminal device in the channel matrix determining method provided in any one of the first aspect or the possible designs of the first aspect.

According to a fourth aspect, an embodiment of this application provides a channel matrix determining method. The method includes: A network device determines a first matrix of k*k; receives first information fed back by m terminal devices; processes the first matrix based on the first information to obtain a second channel matrix; and sends a downlink signal to the terminal device based on the second channel matrix. An $(ij)^{th}$ element in the first matrix indicates a coupling loss of a terminal device i corresponding to a reference signal j, $1 \leq i \leq k$, and $1 \leq j \leq k$; or the $(ij)^{th}$ element in the first matrix indicates a coupling loss of a reference signal i relative to a terminal device j, $1 \leq i \leq k$, and $1 \leq j \leq k$. The first information indicates some channel elements of a first channel matrix of a terminal device corresponding to the first information, the first channel matrix includes a channel element corresponding to the reference signal, a channel element in the some channel elements is determined based on signal strength and/or a time-frequency resource of the reference signal, and $1 \leq m \leq k$.

Based on the fourth aspect, the terminal device feeds back limited channel elements by using the first information, so that the network device processes the first matrix based on the limited channel elements to obtain the second channel matrix, while feedback overheads can be reduced. In addition, because the network device determines the second channel matrix based on the channel elements fed back by the terminal device, an error between an actual beam direction and an ideal beam direction can be reduced, beam sweeping precision can be improved, and communications quality of long-distance communication can be improved.

In a possible design, the network device determines the first matrix based on location information of the network device, location information of k terminal devices, and k reference signals.

Based on the possible design, a feasible solution is provided for the network device to determine the first matrix.

In a possible design, the network device receives location information from the terminal device.

In a possible design, the network device determines the location information of the terminal device based on beam sweeping.

Based on the foregoing two possible designs, when the terminal device has a positioning function, the terminal device may report the location information, so that the network device determines the location information of the terminal device. When the terminal device does not have a positioning function, or has a relatively poor positioning capability, or cannot report the location information, the terminal device and the network device may determine the location information of the terminal device in a beam sweeping manner. This provides feasible solutions for the terminal device and the network device to determine the location information of the terminal device.

In a possible design, the network device sends first indication information to the terminal device, so that the terminal device feeds back the first information in a feedback manner indicated by the first indication information. The feedback manner includes one or more of the following: feeding back the first information based on a channel element, feeding back the first information based on a channel parameter of a channel element, feeding back the first information based on a channel element and a first coefficient, feeding back the first information based on a channel parameter of a channel element and a first coefficient, feeding back the first information based on a channel coefficient, or feeding back the first information based on an indication parameter of a channel coefficient.

Based on the possible design, the terminal device may feed back the first information to the network device in the feedback manner indicated by the network device, so that the terminal device and the network device determine the second channel matrix based on the first information in the same feedback manner, thereby improving accuracy of the second channel matrix determined by the network device, and improving communications quality of a communications system.

In a possible design, the network device sends second indication information to the terminal device, so that the terminal device determines the some channel elements based on the number of channel elements included in the some channel elements that is indicated by the second indication information, and feeds back the first information.

Based on the possible design, the network device may determine, based on actual communications quality of the network device, the number of channel elements to be fed back by the terminal device, so that the terminal device feeds back the first information to the network device based on the number. This provides a feasible solution for the terminal device to feed back the first information.

In a possible design, the network device determines, based on the first information, a channel element corresponding to each piece of first information; and replaces, based on a terminal device corresponding to each channel element and a reference signal corresponding to the channel element, a coupling loss that is in the first matrix and that corresponds to the terminal device and the reference signal with the channel element, to obtain the second channel matrix.

In a possible design, the network device corrects, based on the first information, a coupling loss that is in the first matrix and that corresponds to the first information, to obtain the second channel matrix. A reference signal corresponding to the first information is the same as a reference signal corresponding to the coupling loss corresponding to the first information, and a terminal device corresponding to the first information is the same as a terminal device corresponding to the coupling loss corresponding to the first information.

Based on the foregoing two possible designs, feasible solutions are provided for the network device to determine the second channel matrix based on the first information and the first matrix.

It should be noted that, for description of the first information in the fourth aspect or the possible designs of the fourth aspect, refer to the related description of the first information in the first aspect or the possible designs of the first aspect. Details are not described again.

According to a fifth aspect, an embodiment of this application provides a network device. The network device may implement functions performed by the network device in the fourth aspect or the possible designs of the fourth aspect. The functions may be implemented by hardware executing corresponding software. The hardware or the software includes one or more modules corresponding to the functions, for example, a processing module and a transceiver module. The processing module is configured to determine a first matrix of k*k. The transceiver module is configured to receive first information fed back by m terminal devices. The processing module is further configured to process the first matrix based on the first information to obtain a second channel matrix. The transceiver module is configured to send a downlink signal to the terminal device based on the second channel matrix. An $(ij)^{th}$ element in the first matrix indicates a coupling loss of a terminal device i corresponding to a reference signal j, $1 \le i \le k$, and $1 \le j \le k$; or the $(ij)^{th}$ element in the first matrix indicates a coupling loss of a reference signal i relative to a terminal device j, $1 \le i \le k$, and $1 \le j \le k$. The first information indicates some channel elements of a first channel matrix of a terminal device corresponding to the first information, the first channel matrix includes a channel element corresponding to the reference signal, a channel element in the some channel elements is determined based on signal strength and/or a time-frequency resource of the reference signal, and $1 \le m \le k$.

For an implementation of the network device, refer to behaviors and functions of the network device in the channel matrix determining method according to any one of the fourth aspect or the possible designs of the fourth aspect.

Based on the network device in the fifth aspect, the terminal device feeds back limited channel elements by using the first information, so that the network device processes the first matrix based on the limited channel elements to obtain the second channel matrix, while feedback overheads can be reduced. In addition, because the network device determines the second channel matrix based on the channel elements fed back by the terminal device, an error between an actual beam direction and an ideal beam direction can be reduced, beam sweeping precision can be improved, and communications quality of long-distance communication can be improved.

In a possible design, the processing module is further configured to determine the first matrix based on location information of the network device, location information of k terminal devices, and k reference signals.

Based on the possible design, a feasible solution is provided for the network device to determine the first matrix.

In a possible design, the transceiver module is further configured to receive location information from the terminal device.

In a possible design, the processing module is further configured to determine the location information of the terminal device based on beam sweeping.

Based on the foregoing two possible designs, when the terminal device has a positioning function, the terminal device may report the location information, so that the network device determines the location information of the terminal device. When the terminal device does not have a positioning function, or has a relatively poor positioning capability, or cannot report the location information, the terminal device and the network device may determine the location information of the terminal device in a beam sweeping manner. This provides feasible solutions for the terminal device and the network device to determine the location information of the terminal device.

In a possible design, the transceiver module is further configured to send first indication information to the terminal device, so that the terminal device feeds back the first information in a feedback manner indicated by the first indication information. The feedback manner includes one or more of the following: feeding back the first information based on a channel element, feeding back the first information based on a channel parameter of a channel element, feeding back the first information based on a channel element and a first coefficient, feeding back the first information based on a channel parameter of a channel element and a first coefficient, feeding back the first information based on a channel coefficient, or feeding back the first information based on an indication parameter of a channel coefficient.

Based on the possible design, the terminal device may feed back the first information to the network device in the feedback manner indicated by the network device, so that the terminal device and the network device determine the second channel matrix based on the first information in the same feedback manner, thereby improving accuracy of the second channel matrix determined by the network device, and improving communications quality of a communications system.

In a possible design, the transceiver module is further configured to send second indication information to the terminal device, so that the terminal device determines the some channel elements based on the number of channel elements included in the some channel elements that is indicated by the second indication information, and feeds back the first information.

Based on the possible design, the network device may determine, based on actual communications quality of the network device, the number of channel elements to be fed back by the terminal device, so that the terminal device feeds back the first information to the network device based on the number. This provides a feasible solution for the terminal device to feed back the first information.

In a possible design, the processing module is further configured to: determine, based on the first information, a channel element corresponding to each piece of first information; and replace, based on a terminal device corresponding to each channel element and a reference signal corresponding to the channel element, a coupling loss that is in the first matrix and that corresponds to the terminal device and the reference signal with the channel element, to obtain the second channel matrix.

In a possible design, the processing module is further configured to correct, based on the first information, a coupling loss that is in the first matrix and that corresponds to the first information, to obtain the second channel matrix. A reference signal corresponding to the first information is the same as a reference signal corresponding to the coupling loss corresponding to the first information, and a terminal device corresponding to the first information is the same as a terminal device corresponding to the coupling loss corresponding to the first information.

Based on the foregoing two possible designs, feasible solutions are provided for the network device to determine the second channel matrix based on the first information and the first matrix.

It should be noted that, for description of the first information in the fifth aspect or the possible designs of the fifth aspect, refer to the related description of the first information in the first aspect or the possible designs of the first aspect. Details are not described again.

According to a sixth aspect, an embodiment of this application provides a network device. The network device may be a network device or a chip or a system-on-a-chip in the network device. The network device may implement functions performed by the network device in the foregoing aspects or possible designs, and the functions may be implemented by hardware. In a possible design, the network device may include a transceiver and a processor. The transceiver and the processor may be configured to support the network device in implementing a function in any one of the fourth aspect or the possible designs of the fourth aspect. For example, the processor may be configured to determine a first matrix of k*k. The transceiver may be configured to receive first information fed back by m terminal devices. The processor may be further configured to process the first matrix based on the first information to obtain a second channel matrix. The transceiver may be configured to send a downlink signal to the terminal device based on the second channel matrix. An $(ij)^{th}$ element in the first matrix indicates a coupling loss of a terminal device i corresponding to a reference signal j, $1 \le i \le k$, and $1 \le j \le k$; or the $(ij)^{th}$ element in the first matrix indicates a coupling loss of a reference signal i relative to a terminal device j, $1 \le i \le k$, and $1 \le j \le k$. The first information indicates some channel elements of a first channel matrix of a terminal device corresponding to the first information, the first channel matrix includes a channel element corresponding to the reference signal, a channel element in the some channel elements is determined based on signal strength and/or a time-frequency resource of the reference signal, and $1 \le m \le k$. In another possible design, the network device may further include a memory. The memory is configured to store computer-executable instructions and data for the network device. When the network device runs, the transceiver and the processor execute the computer-executable instructions stored in the memory, to enable the network device to perform the channel matrix determining method according to any one of the fourth aspect or the possible designs of the fourth aspect.

For an implementation of the network device in the sixth aspect, refer to behaviors and functions of the network device in the channel matrix determining method according to any one of the fourth aspect or the possible designs of the fourth aspect.

According to a seventh aspect, a communications apparatus is provided. The communications apparatus includes one or more processors and one or more memories, the one or more memories are coupled to the one or more processors, and the one or more memories are configured to store computer program code or computer instructions. When the one or more processors execute the computer instructions, the communications apparatus is enabled to perform the channel matrix determining method according to any one of the first aspect or the possible designs of the first aspect, or perform the channel matrix determining method according to any one of the fourth aspect or the possible designs of the fourth aspect.

According to an eighth aspect, a computer-readable storage medium is provided. The computer-readable storage medium stores a computer program or instructions, and when the computer program or instructions run on a computer, the computer is enabled to perform the channel matrix determining method according to any one of the first aspect or the possible designs of the first aspect, or perform the channel matrix determining method according to any one of the fourth aspect or the possible designs of the fourth aspect.

According to a ninth aspect, a computer program product including computer instructions is provided. When the computer program product runs on a computer, the computer is enabled to perform the channel matrix determining method according to any one of the first aspect or the possible designs of the first aspect, or perform the channel matrix determining method according to any one of the fourth aspect or the possible designs of the fourth aspect.

According to a tenth aspect, a communications apparatus is provided. The communications apparatus includes a processor and a communications interface. The processor is configured to read instructions. When the communications apparatus is a chip, the communications apparatus may perform the channel matrix determining method according to any one of the first aspect or the possible designs of the first aspect, or perform the channel matrix determining method according to any one of the fourth aspect or the possible designs of the fourth aspect. When the communications apparatus is a terminal device, the communications apparatus may perform the channel matrix determining method according to any one of the first aspect or the possible designs of the first aspect. When the communications apparatus is a network device, the communications apparatus may perform the channel matrix determining method according to any one of the fourth aspect or the possible designs of the fourth aspect. The communications interface is configured to communicate with a module other than the communications apparatus.

For technical effects brought by any design manner of the seventh aspect to the tenth aspect, refer to technical effects brought by any possible design of the first aspect, or refer to technical effects brought by any possible design of the fourth aspect. Details are not described again.

According to an eleventh aspect, a communications system is provided. The communications system includes the terminal device according to either of the second aspect and the third aspect and the network device according to either of the fifth aspect and the sixth aspect.

DESCRIPTION OF EMBODIMENTS

Before embodiments of this application are described, technical terms in the embodiments of this application are described.

Beam: Because signal energy sharply decreases with a transmission distance, a signal transmission distance is short. In a long-distance communications scenario, a sending device may perform weighting processing on a signal by using a large-scale antenna array, to concentrate signal energy in a small range, that is, a beam, to increase a transmission distance.

Figure 1A:
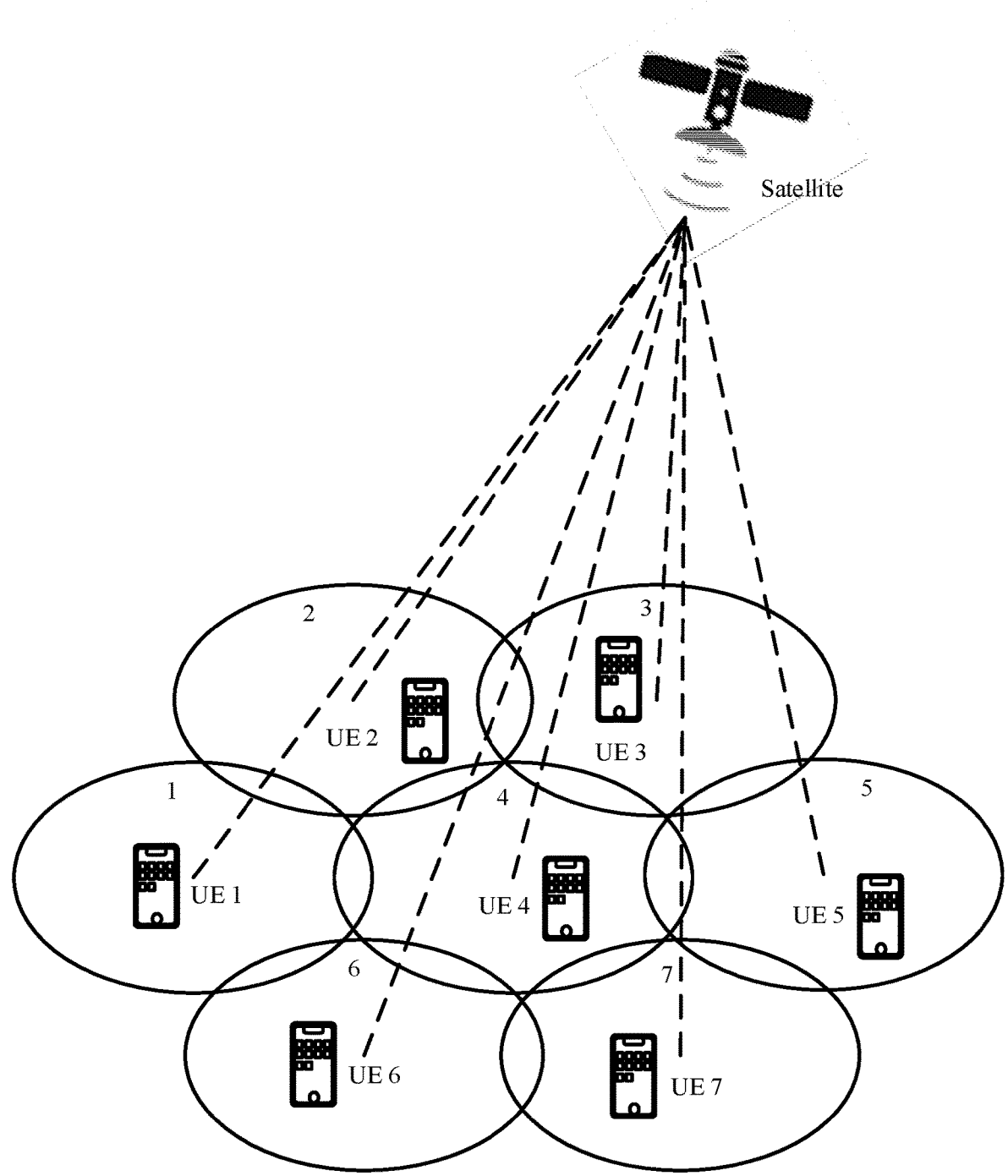
FIG. 1a is a diagram of composition of a satellite communications scenario according to an embodiment of this application.

For example, as shown in FIG. 1a, the communications scenario is a satellite communications scenario. The sending device may be a satellite. Assuming that receiving devices include user equipment (UE) 1, UE 2, UE 3, UE 4, UE 5, UE 6, and UE 7, the sending device may respectively form a beam 1, a beam 2, a beam 3, a beam 4, a beam 5, a beam 6, and a beam 7 based on the receiving devices.

Inter-beam interference: When beams are spatially close to each other, interference occurs between the beams.

For example, as shown in FIG. 1a, because the beam 1 overlaps the beam 2, inter-beam interference occurs between the beam 1 and the beam 2. Similarly, inter-beam interference also occurs between the beam 1 and the beam 4, and between the beam 1 and the beam 6.

For example, the sending device may use a multi-antenna technology to transmit signals by using a plurality of antennas, to send the signals to the receiving devices over a plurality of beams, to improve a throughput of a communications system. However, when a plurality of beams are used for signal transmission, inter-beam interference occurs due to overlapping between beams. Consequently, communications quality of a receiving device located at a beam edge is relatively poor. The inter-beam interference may be suppressed by using a higher frequency reuse factor, to improve the communications quality of the receiving device located at the beam edge. However, use of the higher frequency reuse factor reduces spectral efficiency of the communications system. To improve the spectral efficiency, a full-frequency reuse technology may be used. All beams are transmitted in a same band, so that band utilization of the communications system can be maximized. However, use of the full-frequency reuse technology causes severer inter-beam interference.

Therefore, to improve the band utilization of the communications system while effectively suppressing inter-beam interference, a precoding technology is proposed. That is, before sending a signal, the sending device may perform precoding processing on the signal based on channel state information (CSI) obtained in advance, so that the signal sent by the sending device better matches a current transport channel, thereby overcoming inter-beam interference, improving communications performance of the communications system, improving the band utilization of the communications system, and creating a high-quality communications link environment.

It should be noted that when multi-color multiplexing is used, interference also occurs between beams of a same color. Embodiments of this application are also applicable to multi-color beams, to reduce interference between same beams.

In some embodiments, for example, the sending device is a network device, and the receiving device is a terminal device. When sending a downlink signal to the terminal device, the network device may determine a precoding matrix based on a channel matrix corresponding to a downlink channel, perform precoding processing on the downlink signal based on the precoding matrix, and then send the downlink signal to the terminal device. After receiving the downlink signal, the terminal device may determine the precoding matrix based on the channel matrix corresponding to the downlink channel, and decode the received downlink signal based on the precoding matrix.

For example, when an uplink channel and the downlink channel are reciprocal, the network device may consider that the downlink channel and the uplink channel have similar channel characteristics, and derive, based on an uplink reference signal, the channel matrix corresponding to the downlink channel, to determine the precoding matrix.

For example, a time division duplex (TDD) system is used as an example. Because a same band is used for an uplink and a downlink in the TDD system, an uplink channel and a downlink channel are basically the same in attenuation, and it may be considered that the uplink channel and the downlink channel in the TDD system are reciprocal. Based on this, the network device may determine a channel matrix of the uplink channel based on an uplink reference signal, and consider that a channel matrix of the downlink channel is the same as the channel matrix of the uplink channel, to determine a precoding matrix based on the channel matrix of the downlink channel.

In another example, when the uplink channel and the downlink channel are not reciprocal, the network device may send a downlink reference signal to the terminal device, and the terminal device may measure the downlink channel based on the downlink reference signal, to obtain the channel matrix corresponding to the downlink channel, and feed back the channel matrix of the downlink channel to the network device.

For example, frequency division duplex (FDD) is used as an example. Because an uplink channel and a downlink channel in an FDD system have different bands, it may be considered that the uplink channel and the downlink channel in the FDD system are not reciprocal. Based on this, the network device may send a downlink reference signal to the terminal device, so that the terminal device determines a channel matrix of the downlink channel based on the downlink reference signal, and feeds back the channel matrix to the network device.

It should be noted that when the uplink channel and the downlink channel are reciprocal, the network device may alternatively determine the channel matrix of the downlink channel in a manner in which the terminal device feeds back the channel matrix. This is not limited.

In the foregoing two examples, when the network device derives the channel matrix of the downlink channel based on the uplink reference signal, the terminal device may not need to perform feedback, thereby reducing feedback overheads. However, this is applicable only to a communications scenario in which uplink and downlink channels are reciprocal. When the network device determines the channel matrix of the downlink channel based on feedback of the terminal device, because the terminal device needs to feed back the channel matrix of the downlink channel as complete as possible, feedback overheads of the terminal device are higher.

Based on the foregoing two embodiments, a codebook feedback manner is proposed. That is, the terminal device determines the precoding matrix based on the channel matrix, and feeds back related information of the precoding matrix to the network device in a precoding matrix indicator (precoding matrix indication, PMI) manner, so that the network device restores the precoding matrix based on the related information of the precoding matrix in the PMI indicator. This reduces feedback overheads of the terminal device, and is applicable to communications scenarios in which uplink and downlink channels are reciprocal and are not reciprocal.

For example, the PMI indicator may include the following indication parameters: $i_{1,1}$, $i_{1,2}$, $i_{1,3}$, and $i_2$.

$$i_1 = \begin{cases} [i_{1,1} \ i_{1,2}] \\ [i_{1,1} \ i_{1,2} \ i_{1,3}] \end{cases},$$

and $$v \notin \{2, 3, 4\} \\ v \in \{2, 3, 4\}.$$

When a quantity v of data layers is 1, the terminal device may not need to feed back $i_{1,3}$.

In some embodiments, the network device may determine codebook parameters l, m, and n based on a predetermined codebook mode and the indication parameters in the PMI indicator, and determine the precoding matrix based on the codebook parameters. Different codebook modes represent different manners of mapping $i_{1,1}$, $i_{1,2}$, $i_{1,3}$, and $i_2$ to codebook parameters l, m, and n.

For example, the precoding matrix may be $$W_{l,m,n}^{(1)} = \frac{1}{\sqrt{P_{CSI-RS}}} \begin{bmatrix} v_{l,m} \\ \varphi_n v_{l,m} \end{bmatrix}.$$

$P_{CSI-RS}$ may be used to indicate signal power of a channel state information reference signal (CSI-RS);

$$\varphi_n = e^{j\pi n/2};$$
$$u_m = \begin{cases} \begin{bmatrix} 1 & e^{j\frac{2\pi m}{O_2 N_2}} & L & e^{j\frac{2\pi m(N_2-1)}{O_2 N_2}} \end{bmatrix}, \text{ where } \begin{matrix} N_2 > 1 \\ N_2 = 1 \end{matrix}; \text{ and} \\ 1 \end{cases}$$
$$v_{l,m} = \begin{bmatrix} u_m & e^{j\frac{2\pi l}{O_1 N_1}} u_m & L & e^{j\frac{2\pi l(N_2-1)}{O_1 N_1}} \end{bmatrix}^T$$

For example, with reference to the following Table 1 and Table 2, an example in which the quantity of data layers is 1 is used. The terminal device may feed back $i_{1,1}$, $i_{1,2}$, and $i_2$ in a codebook mode 1 shown in Table 1 or a codebook mode 2 shown in Table 2. When the codebook mode is the codebook mode 1 shown in Table 1, $i_{1,1}$, $i_{1,2}$, and $i_2$ may be directly mapped to l, m, and n. When the codebook mode is the codebook mode 2 shown in Table 2, a manner of mapping $i_{1,1}$, $i_{1,2}$, and $i_2$ to l, m, and n may depend on a value of $i_2$. For example, when $i_2=0$, $l=2i_{1,1}$, $m=2i_{1,2}$, and $n=0$; when $i_2=5$, $l=2i_{1,1}+1$, $m=2i_{1,2}$, and $n=1$.

TABLE 1

| Codebook mode 1 | | | |
|---|---|---|---|
| $i_{1,1}$ | $i_{1,2}$ | $i_2$ | |
| 0, 1, K, $N_1 O_1 - 1$ | 0, K, $N_2 O_2 - 1$ | 0, 1, 2, 3 | $W_{i_{1,1},i_{1,2},i_2}^{(1)}$ |
| | $W_{l,m,n}^{(1)} = \frac{1}{\sqrt{P_{CSI-RS}}} \begin{bmatrix} v_{l,m} \\ \varphi_n v_{l,m} \end{bmatrix}$ | | |

TABLE 2

Codebook mode 2, where $N_2 > 1$

| $i_{1,1}$ | $i_{1,2}$ | $i_2$ 0 | 1 | 2 | 3 |
|---|---|---|---|---|---|
| $0, 1, \ldots, \frac{N_1O_1}{2}-1$ | $0, 1, \ldots, \frac{N_2O_2}{2}-1$ | $W_{2i_{1,1},2i_{1,2},0}^{(1)}$ | $W_{2i_{1,1},2i_{1,2},1}^{(1)}$ | $W_{2i_{1,1},2i_{1,2},2}^{(1)}$ | $W_{2i_{1,1},2i_{1,2},3}^{(1)}$ |

| $i_{1,1}$ | $i_{1,2}$ | $i_2$ 4 | 5 | 6 | 7 |
|---|---|---|---|---|---|
| $0, 1, \ldots, \frac{N_1O_1}{2}-1$ | $0, 1, \ldots, \frac{N_2O_2}{2}-1$ | $W_{2i_{1,1}+1,2i_{1,2},0}^{(1)}$ | $W_{2i_{1,1}+1,2i_{1,2},1}^{(1)}$ | $W_{2i_{1,1}+1,2i_{1,2},2}^{(1)}$ | $W_{2i_{1,1}+1,2i_{1,2},3}^{(1)}$ |

| $i_{1,1}$ | $i_{1,2}$ | $i_2$ 8 | 9 | 10 | 11 |
|---|---|---|---|---|---|
| $0, 1, \ldots, \frac{N_1O_1}{2}-1$ | $0, 1, \ldots, \frac{N_2O_2}{2}-1$ | $W_{2i_{1,1},2i_{1,2}+1,0}^{(1)}$ | $W_{2i_{1,1},2i_{1,2}+1,1}^{(1)}$ | $W_{2i_{1,1},2i_{1,2}+1,2}^{(1)}$ | $W_{2i_{1,1},2i_{1,2}+1,3}^{(1)}$ |

| $i_{1,1}$ | $i_{1,2}$ | $i_2$ 12 | 13 | 14 | 15 |
|---|---|---|---|---|---|
| $0, 1, \ldots, \frac{N_1O_1}{2}-1$ | $0, 1, \ldots, \frac{N_2O_2}{2}-1$ | $W_{2i_{1,1}+1,2i_{1,2}+1,0}^{(1)}$ | $W_{2i_{1,1}+1,2i_{1,2}+1,1}^{(1)}$ | $W_{2i_{1,1}+1,2i_{1,2}+1,2}^{(1)}$ | $W_{2i_{1,1}+1,2i_{1,2}+1,3}^{(1)}$ |

$$W_{l,m,n}^{(1)} = \frac{1}{\sqrt{P_{CSI-RS}}} \begin{bmatrix} v_{l,m} \\ \varphi_n v_{l,m} \end{bmatrix}$$

Further, the network device may further determine a beam direction based on the PMI indicator, and send the downlink signal to the terminal device based on the beam direction.

Figure 1B:
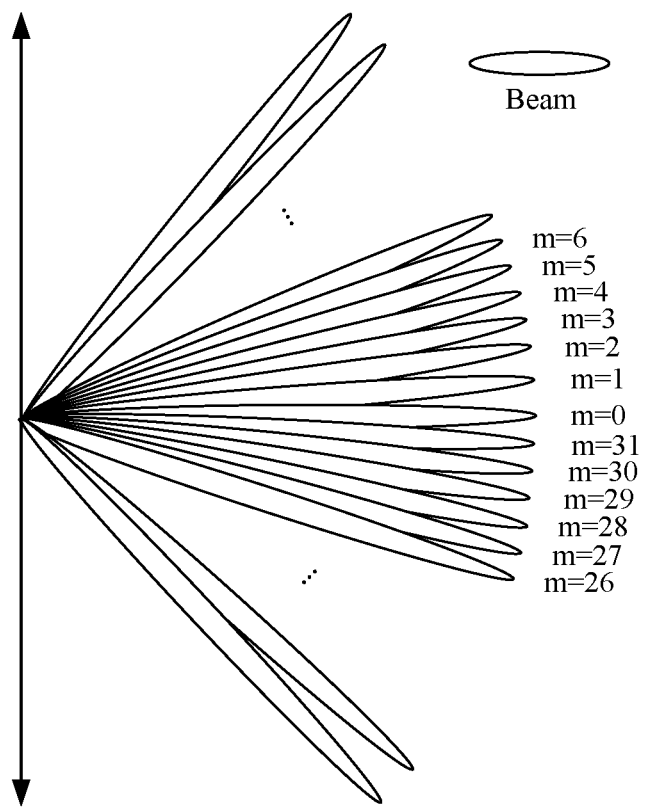
FIG. 1b is a diagram of a spatial beam direction corresponding to a PMI indicator according to an embodiment of this application.

For example, as shown in FIG. 1b, it is assumed that l and n are fixed, and different m may correspond to different beam directions. Because a quantity of m in a codebook is limited, a corresponding spatial beam direction in the PMI indicator manner is limited.

Because the corresponding spatial beam direction in the PMI indicator manner is limited, there may be an error between an actual beam direction determined based on the PMI indicator and an ideal beam direction. When there is an error between the actual beam direction and the ideal beam direction, in a satellite communications scenario, as a communications distance between the terminal device and the network device increases, an error distance generated on ground becomes larger, thereby affecting communications quality of the terminal device. In addition, if beam sweeping precision is increased by adding a codebook, huge overheads are introduced. This is not applicable to an actual communications application. Therefore, such a manner in which the network device determines the precoding matrix based on the existing PMI indicator is not applicable to long-distance communication.

To resolve the problem, an embodiment of this application provides a channel matrix determining method. A terminal device may obtain a plurality of reference signals, determine a first channel matrix based on the plurality of reference signals, and feed back, to a network device, first information indicating some channel elements in the first channel matrix. A channel element in the some channel elements is determined based on signal strength and/or a time-frequency resource of the reference signal. The network device may determine a first matrix, process the first matrix based on received first information sent by a plurality of terminal devices, to obtain a second channel matrix corresponding to the network device, and send a downlink signal to the terminal device based on the second channel matrix. The first matrix may be a k*k matrix. An $(ij)^{th}$ element in the first matrix indicates a coupling loss of a terminal device i corresponding to a reference signal j, $1 \leq i \leq k$, and $1 \leq j \leq k$; or the $(ij)^{th}$ element in the first matrix indicates a coupling loss of a reference signal i relative to a terminal device j, $1 \leq i \leq k$, and $1 \leq j \leq k$. In this embodiment of this application, the terminal device feeds back limited channel elements by using the first information, so that the network device processes the first matrix based on the limited channel elements to obtain the second channel matrix, and feedback overheads can be reduced. In addition, because the network device determines the second channel matrix based on the channel elements fed back by the terminal device, an error between an actual beam direction and an ideal beam direction can be reduced, beam sweeping precision can be improved, and communications quality of long-distance communication can be improved.

The following describes implementations of this embodiment of this application in detail with reference to accompanying drawings of this specification.

The channel matrix determining method provided in this embodiment of this application may be applied to any communications system. The communications system may be a 3rd generation partnership project (3GPP) communications system, for example, a long term evolution (LTE) system, or may be a 5th generation (5G) mobile communications system, a new radio (NR) system, or a new radio vehicle to everything (NR V2X) system. The method may also be applied to a hybrid networking system of LTE and 5G, a device-to-device (D2D) communications system, a machine-to-machine (M2M) communications system, an Internet of things (IoT), and another next-generation communications system, and may also be applied to a non-3GPP communications system. This is not limited.

The channel matrix determining method provided in this embodiment of this application may be applied to various communications scenarios. For example, the method may be applied to one or more of the following communications scenarios: enhanced mobile broadband (eMBB), ultra-reliable and low latency communications (URLLC), machine type communication (MTC), massive machine type communications (mMTC), D2D, V2X, IoT, and the like.

The channel matrix determining method provided in this embodiment of this application may also be applied to a long-distance communications scenario, for example, applied to a satellite communications scenario in which a distance between a terminal device and a network device constantly changes, or another long-distance communications scenario. This is not limited.

Figure 1C:
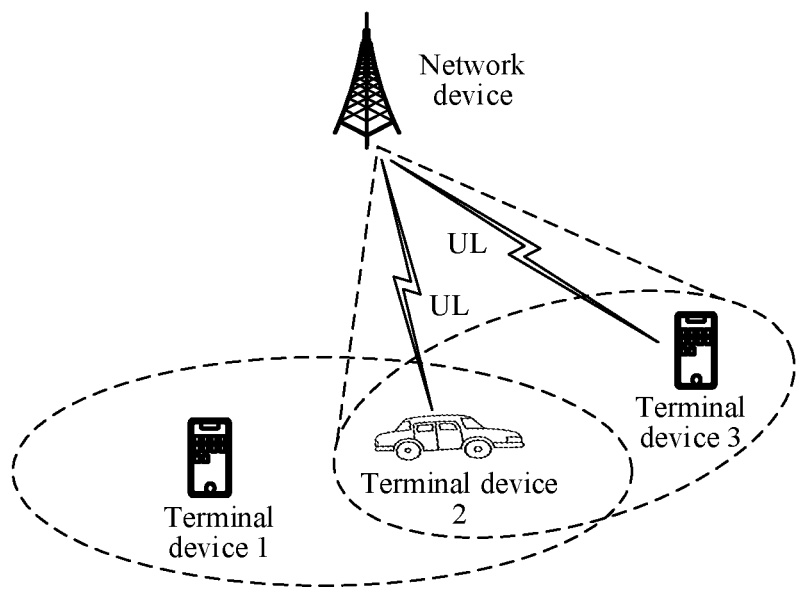
FIG. 1c is a diagram of a communications system according to an embodiment of this application.

The following uses FIG. 1c as an example to describe the channel matrix determining method provided in this embodiment of this application.

FIG. 1c is a schematic diagram of a communications system according to an embodiment of this application. For example, the communications system is a non-terrestrial network (NTN) communications system. As shown in FIG. 1c, the NTN communications system may include at least one terminal device and at least one network device.

In FIG. 1c, the terminal device may be located in a beam/cell coverage area of the network device. The terminal device may perform air interface communication with the network device via an uplink (UL) or a downlink (DL). For example, the terminal device may send uplink data to the network device in a UL direction over a physical uplink shared channel (PUSCH), and the network device may send downlink data to the terminal device in a DL direction over a physical downlink shared channel (PDSCH).

The terminal device in FIG. 1c may be referred to as UE, a mobile station (MS), a mobile terminal (MT), or the like. In some embodiments, the terminal device in FIG. 1c may be a mobile phone, a tablet computer, or a computer with a wireless transceiver function. Alternatively, the terminal device may be a virtual reality (VR) terminal, an augmented reality (AR) terminal, a wireless terminal in industrial control, a wireless terminal in self-driving, a wireless terminal in telemedicine, a wireless terminal in a smart grid, a wireless terminal in a smart city, a wireless terminal in a smart home, a vehicle-mounted terminal, a vehicle having a vehicle-to-vehicle (V2V) communications capability, an intelligent connected vehicle, an unmanned aerial vehicle having an unmanned aerial vehicle to unmanned aerial vehicle (UAV to UAV, U2U) communications capability, or the like. This is not limited.

Figure 1D:
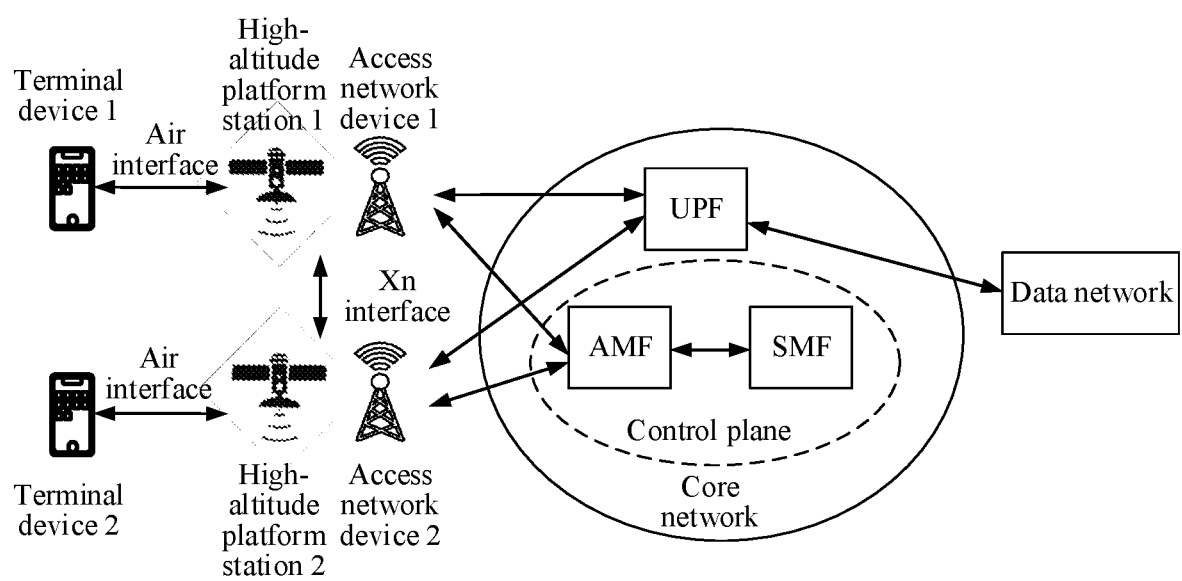
FIG. 1d is a diagram of a communications system according to an embodiment of this application.

For example, with reference to FIG. 1d, the network device may include an access network device and a high-altitude platform station, and the access network device may be carried on the high-altitude platform station. When the access network device is carried on the high-altitude platform station, the communications system shown in FIG. 1c may be a communications architecture shown in FIG. 1d. As shown in FIG. 1d, the access network device and the high-altitude platform station move synchronously. The access network device and the high-altitude platform station may be considered as a whole. In this case, the high-altitude platform station may be considered as an access network device, or in other words, the high-altitude platform station works in a regenerative mode (regenerative), that is, the high-altitude platform station has a function of the access network device. In addition, a communications link between the high-altitude platform station and the terminal device may be referred to as a service link. When the communications system includes a plurality of high-altitude platform stations, the high-altitude platform stations may communicate with each other through an Xn interface.

Figure 1E:
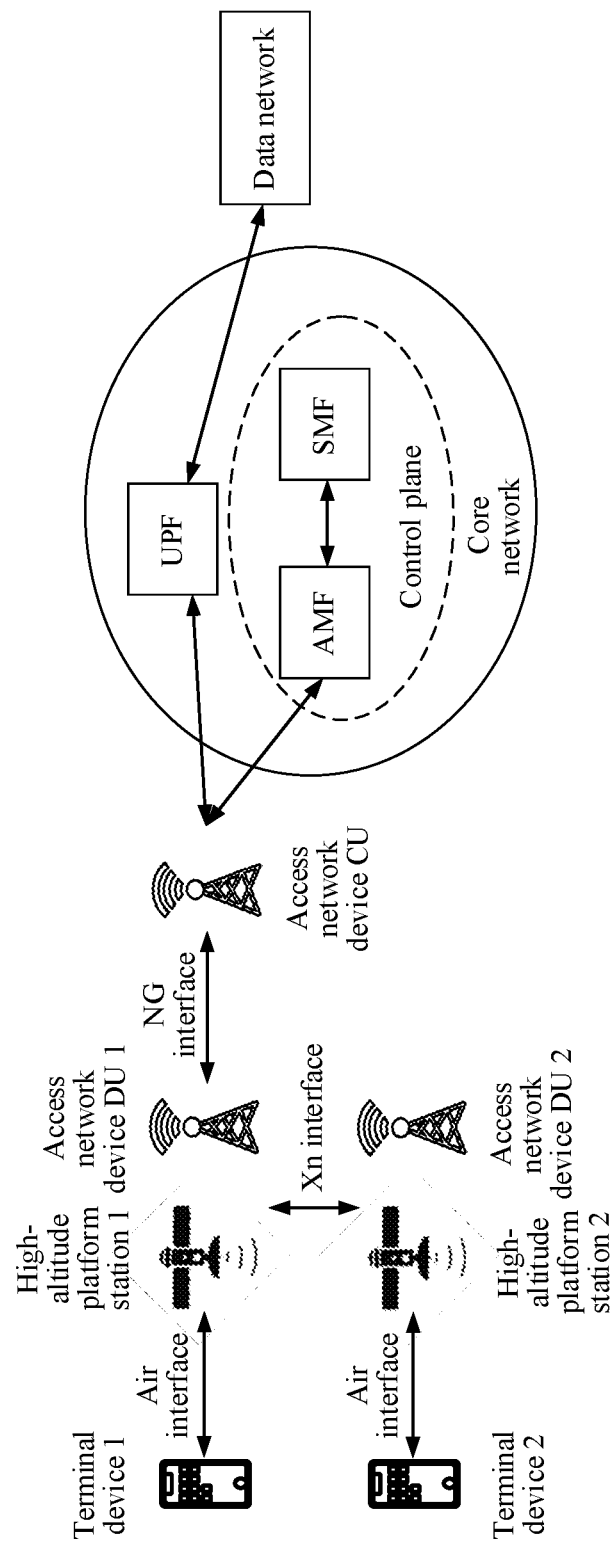
FIG. 1e is a diagram of a communications system according to an embodiment of this application.

In another example, with reference to FIG. 1e, the network device may include an access network device and a high-altitude platform station, and the access network device may be carried on the high-altitude platform station in a distributed manner based on a distributed unit (distributed unit, DU). When the access network device is carried on the high-altitude platform station in the distributed manner based on the DU, the communications system shown in FIG. 1c may be a communications architecture shown in FIG. 1e. As shown in FIG. 1e, the access network device may include an access network device DU and an access network device central unit (CU). The access network device DU may be carried on the high-altitude platform station. The access network device CU may be disposed on ground. The access network device DU and the access network device CU may communicate with each other through a next generation (NG) interface, and the terminal device may establish a communications connection to the access network device CU by using the access network device DU. In this case, the high-altitude platform station may be considered as a partial access network device, or in other words, the high-altitude platform station works in a regenerative mode, that is, the high-altitude platform station has a function of the partial access network device. In addition, when the communications system includes a plurality of high-altitude platform stations, the high-altitude platform stations may communicate with each other through an Xn interface. A communications link between the high-altitude platform station and the terminal device may be referred to as a service link, and a communications link between the high-altitude platform station and the access network device CU may be referred to as a feeder link. It should be noted that the communications architecture in FIG. 1e may be considered as a special example of the communications architecture shown in FIG. 1d. In FIG. 1e, the access network device CU may also be described as a gateway station, a ground station, or the like. This is not limited.

Figure 1F:
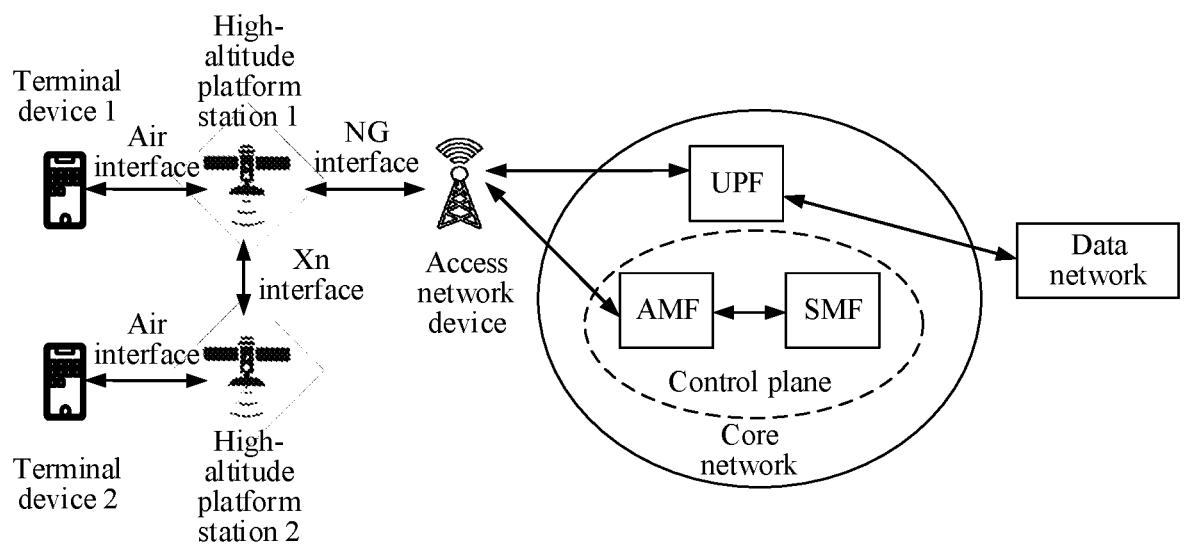
FIG. 1f is a diagram of a communications system according to an embodiment of this application.

In still another example, with reference to FIG. 1f, the network device may include an access network device and a high-altitude platform station. The access network device may be disposed on ground, and the terminal device and the access network device may communicate with each other through signal forwarding by the high-altitude platform station. When the access network device is disposed on ground, the communications system shown in FIG. 1c may be a communications architecture shown in FIG. 1f. As shown in FIG. 1f, the terminal device and the access network device may communicate with each other through signal forwarding by the high-altitude platform station. In some embodiments, the high-altitude platform station and the access network device may communicate with each other through an NG interface. The high-altitude platform station may be a transmission/reception point (TRP) that provides wireless access for the terminal device. The TRP may transparently transmit data between the terminal device and the access network device, to implement a communications connection between the terminal device and the access network device. In this case, in other words, the high-altitude platform station works in a transparent transmission mode (transparent). In addition, when the communications system includes a plurality of high-altitude platform stations, the high-altitude platform stations may communicate with each other through an Xn interface. A communications link between the high-altitude platform station and the terminal device may be referred to as a service link, and a communications link between the high-altitude platform station and the access network device may be referred to as a feeder link. It should be noted that the access network device may also be described as a gateway station, a ground station, or the like. This is not limited.

The access network device may be any device having a wireless transceiver function, and is mainly configured to implement functions such as a wireless physical control function, resource scheduling, radio resource management, radio access control, and mobility management, provide a reliable wireless transmission protocol and data encryption protocol, and the like. In some embodiments, the access network device may be a device supporting wired access, or may be a device supporting wireless access. For example, the access network device may be an access network (access network, AN)/radio access network (RAN) device, and includes a plurality of 5G-AN/5G-RAN nodes. The 5G-AN/5G-RAN node may be an access point (AP), a NodeB (NB), an enhanced NodeB (eNB), a next-generation NodeB (gNB), a transmission/reception point (TRP), a transmission point (TP), another access node, or the like.

The high-altitude platform station may be an aircraft such as a satellite or an unmanned aerial vehicle. For example, based on an altitude of the high-altitude platform station, the high-altitude platform station may include a low earth orbit satellite, a medium earth orbit satellite, a geostationary earth orbit satellite, an unmanned aerial system platform, and a high earth orbit satellite.

The low earth orbit satellite and the medium earth orbit satellite may have their own motion tracks, and generally, a plurality of satellites cooperate to provide communication for a fixed area. The high earth orbit satellite is generally in a stationary state, and one or a few high earth orbit satellites provide communication for a fixed area.

Compared with terrestrial communication, satellite communication has its unique advantages. For example, a wider coverage area can be provided, a satellite is not easily damaged by natural disasters or external forces, and a communications service can be provided for some areas that cannot be covered by a terrestrial communications network, such as an ocean or a forest, to enhance reliability of a communications system. For example, it is ensured that a plane, a train, and terminal devices on those vehicles can obtain a better communications service, more data transmission resources are provided for the communications system, and a network rate is improved. Therefore, a communications system that supports both ground communication and satellite communication has advantages such as wide coverage, high reliability, multi-connection, and a high throughput.

In addition, in FIG. 1d to FIG. 1f, the communications system may further include a core network device and a data network (DN). The terminal device may communicate with the data network by using the network device and the core network device.

The core network device may be configured to send, to the data network, data of the terminal device that is sent by the network device. In some embodiments, the core network device may be configured to implement services such as user access control, mobility management, session management, user security authentication, and charging. The core network device may include a plurality of function units. For example, the core network device may be divided into a control plane function entity and a data plane function entity. The control plane function entity may include an access and mobility management unit (AMF), a session management unit (SMF), and the like. The data plane function entity may include a user plane unit (UPF) and the like.

The access and mobility management unit is mainly responsible for work such as access authentication and mobility management of user equipment, and signaling exchange between function network elements, for example, managing a registration status of a user, a connection status of the user, user registration and network access, tracking area update, user authentication during cell switching, and key security.

The session management unit may also be referred to as a session management function, a multicast/broadcast-service management function (MB-SMF), a multicast session management network element, or the like. This is not limited. The session management network element is mainly configured to implement a user plane transmission logical channel, for example, a session management function such as establishment, release, and modification of a packet data unit (PDU) session.

The user plane unit may also be referred to as a PDU session anchor (PSF), a user plane function, or a multicast/broadcast user plane function (MB-UPF). The user plane network element may be used as an anchor on the user plane transmission logical channel, and is mainly configured to complete functions such as routing and forwarding of user plane data, for example, establishing a channel (namely, the user plane transmission logical channel) to the terminal, forwarding a data packet between the terminal device and the DN on the channel, and responsible for data packet filtering, data forwarding, rate control, generation of charging information, traffic statistics, network listening, and the like for the terminal. A multicast/broadcast (MB) service controller (MB service controller) has service management functions such as group management, security management, and service announcement.

It should be noted that, in addition to the foregoing units, the core network device may further include a policy control unit (PCF), an application function unit (AF), and the like. This is not limited.

The data network may be an operator network that provides a data transmission service for the terminal device, for example, an operator network that may provide an IP multimedia service (IMS) for the terminal device. An application server (AS) may be deployed in the DN, and the application server may provide the data transmission service for the user.

Figure 2:
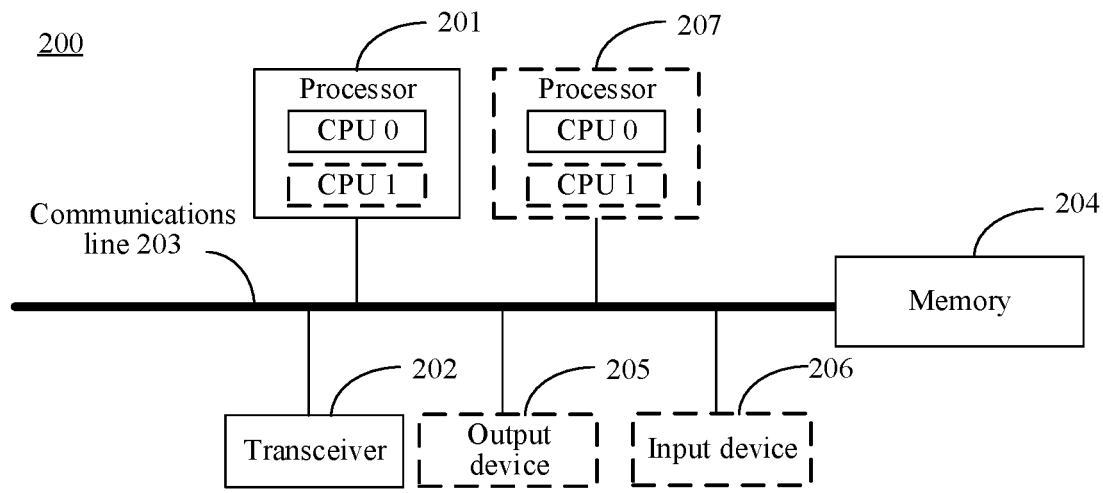
FIG. 2 is a diagram of composition of a communications apparatus according to an embodiment of this application.

During an implementation, as shown in FIG. 1c to FIG. 1f, each terminal device and each network device may use a composition structure shown in FIG. 2, or include components shown in FIG. 2. FIG. 2 is a schematic diagram of composition of a communications apparatus 200 according to an embodiment of this application. The communications apparatus 200 may be a terminal device or a chip or a system-on-a-chip in the terminal device, or may be a network device or a chip or a system-on-a-chip in the network device. As shown in FIG. 2, the communications apparatus 200 includes a processor 201, a transceiver 202, and a communications line 203.

Further, the communications apparatus 200 may further include a memory 204. The processor 201, the memory 204, and the transceiver 202 may be connected by using the communications line 203.

The processor 201 is a central processing unit (CPU), a general-purpose processor, a network processor (NP), a digital signal processor (DSP), a microprocessor, a microcontroller, a programmable logic device (PLD), or any combination thereof. Alternatively, the processor 201 may be another apparatus having a processing function, for example, a circuit, a component, or a software module. This is not limited.

The transceiver 202 is configured to communicate with another device or another communications network. The another communications network may be an Ethernet, a radio access network (RAN), a wireless local area network (WLAN), or the like. The transceiver 202 may be a module, a circuit, a transceiver, or any apparatus that can implement communication.

The communications line 203 is configured to transmit information between components included in the communications apparatus 200.

The memory 204 is configured to store instructions. The instructions may be a computer program.

The memory 204 may be a read-only memory (ROM) or another type of static storage device that can store static information and/or instructions, or may be a random access memory (RAM) or another type of dynamic storage device that can store information and/or instructions, or may be an electrically erasable programmable read-only memory (EEPROM), a compact disc read-only memory (CD-ROM) or another compact disc storage, an optical disc storage (including a compact disc, a laser disc, an optical disc, a digital universal optical disc, a Blu-ray disc, or the like), a magnetic disk storage medium or another magnetic storage device, or the like. This is not limited.

It should be noted that the memory 204 may be independent of the processor 201, or may be integrated with the processor 201. The memory 204 may be configured to store instructions, program code, some data, or the like. The memory 204 may be located inside the communications apparatus 200, or may be located outside the communications apparatus 200. This is not limited. The processor 201 is configured to execute the instructions stored in the memory 204, to implement a channel matrix determining method provided in following embodiments of this application.

In an example, the processor 201 may include one or more CPUs, for example, a CPU 0 and a CPU 1 in FIG. 2.

In an optional implementation, the communications apparatus 200 includes a plurality of processors, for example, may further include a processor 207, in addition to the processor 201 in FIG. 2.

In an optional implementation, the communications apparatus 200 further includes an output device 205 and an input device 206. For example, the input device 206 is a device such as a keyboard, a mouse, a microphone, or a joystick, and the output device 205 is a device such as a display screen or a speaker.

It should be noted that the communications apparatus 200 may be a desktop computer, a portable computer, a network server, a mobile phone, a tablet computer, a wireless terminal, an embedded device, a chip system, or a device having a structure similar to the structure in FIG. 2. In addition, the composition structure shown in FIG. 2 does not constitute a limitation on the communications apparatus. In addition to the components shown in FIG. 2, the communications apparatus may include more or fewer components than those shown in the figure, combine some components, or have different component arrangements.

In this embodiment of this application, the chip system may include a chip, or may include a chip and another discrete component.

In addition, for actions, terms, and the like in embodiments of this application, refer to each other. This is not limited. In embodiments of this application, names of messages exchanged between devices, names of parameters in the messages, or the like are merely examples. Other names may alternatively be used during implementation. This is not limited.

With reference to the communications systems shown in FIG. 1c to FIG. 1f, the following uses a multi-user multiple input multiple output (MIMO) technology as an example to describe the channel matrix determining method provided in embodiments of this application.

Figure 3:
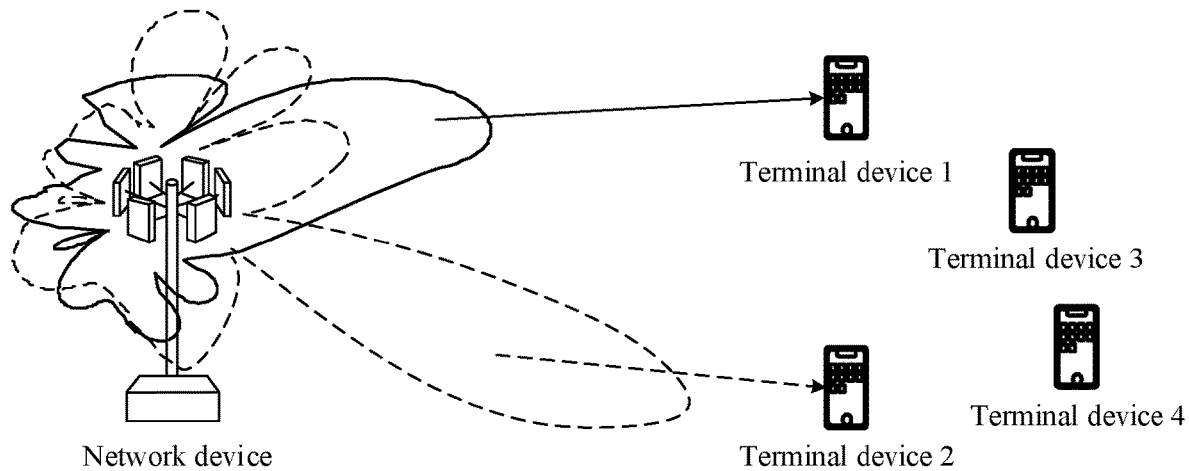
FIG. 3 is a diagram of composition of a multi-user MIMO technology according to an embodiment of this application.

As shown in FIG. 3, the multi-user MIMO technology may mean that in a wireless communications system, one network device simultaneously serves a plurality of terminal devices, and the network device communicates with the plurality of terminal devices simultaneously by fully using spatial resources of antennas. The terminal device may be any terminal device in the communications systems shown in FIG. 1i to FIG. 1f. The network device may be any network device that is in the communications systems shown in FIG. 1c to FIG. 1f and that communicates with the terminal device. Both the terminal device and the network device in the following embodiments may have the components shown in FIG. 2.

Figure 4:
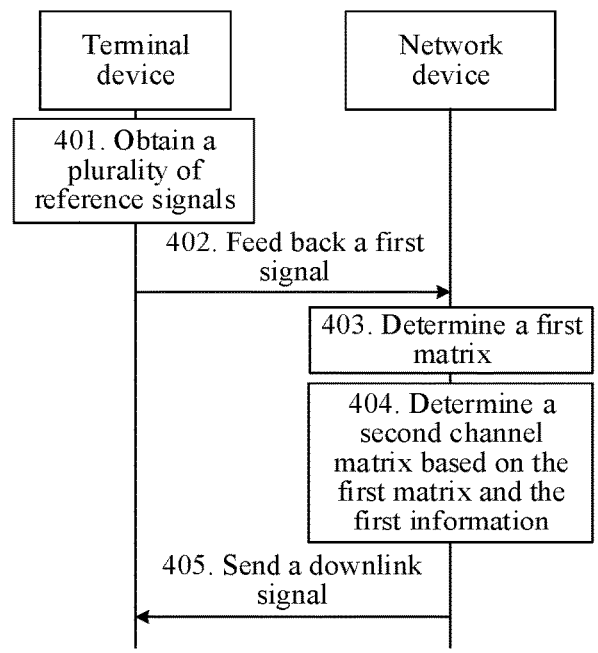
FIG. 4 is a flowchart of a channel matrix determining method according to an embodiment of this application.

FIG. 4 is a flowchart of a channel matrix determining method according to an embodiment of this application. As shown in FIG. 4, the method may include the following operations.

Operation 401: A terminal device obtains a plurality of reference signals.

The plurality of reference signals may include a wanted signal and an interfering signal.

In some embodiments, a beam may point to the terminal device based on a geographical location of the terminal device, or may point to a particular direction based on a particular geographical location. Because each beam includes a main lobe and a side lobe, the terminal device may receive a main lobe signal sent by a beam corresponding to the terminal device, that is, a wanted signal, and may also receive a side lobe signal sent by a beam corresponding to another terminal device, that is, an interfering signal.

For example, with reference to FIG. 1a, a terminal device 1 corresponds to a beam 1, a terminal device 2 corresponds to a beam 2, and a terminal device 4 corresponds to a beam 4. The terminal device 1 may receive a wanted signal sent by the beam 1, and receive interfering signals sent by the beam 2 and the beam 4. The terminal device 2 may receive a wanted signal sent by the beam 2, and receive interfering signals sent by the beam 1 and the beam 4. The terminal device 4 may receive a wanted signal sent by the beam 4, and receive interfering signals sent by the beam 1 and the beam 2.

It should be noted that the foregoing uses only the beam 1, the beam 2, and the beam 4 as examples for description. It may be understood that the terminal device 1 may also receive interfering signals sent by a beam 3, a beam 5, and another beam, and the terminal device 2 may also receive the interfering signals sent by the beam 3, the beam 5, and the another beam. This is not limited.

It should be noted that when the beam points to the terminal device based on the geographical location of the terminal device, a communications angle between any two terminal devices is equal to a communications angle between beams corresponding to the two terminal devices. The communications angle between any two terminal devices is equal to an angle formed by a line segment between one terminal device and a network device and a line segment between the other terminal device and the network device. In addition, a communications angle between the terminal device and the beam is equal to an angle between the beam and a line segment between the terminal device and the network device.

In some embodiments, when the network device serves a plurality of terminal devices, each terminal device receives a plurality of reference signals sent by the network device over channels corresponding to a plurality of beams. The network device sends different reference signals over channels corresponding to different beams.

For example, the network device serves k terminal devices. The network device may send k reference signals over channels corresponding to k beams. Different beams may correspond to different terminal devices, and different beams may also correspond to different reference signals. The terminal device may receive, over a channel corresponding to the terminal device, a reference signal sent by a beam corresponding to the terminal device, that is, a wanted signal, and may also receive, over the channel corresponding to the terminal device, reference signals sent by k−1 other beams, that is, k−1 interfering signals.

Alternatively, the reference signal may alternatively be a downlink signal, such as a synchronization signal and physical broadcast signal block (SSB), on which the terminal device may perform channel measurement based on the received signal. This is not limited.

Operation 402: The terminal device feeds back first information to the network device.

The first information may be used to indicate some channel elements in a first channel matrix. The first channel matrix may include a channel element corresponding to the reference signal. A channel element in the some channel elements may be determined based on signal strength and/or a time-frequency resource of the reference signal.

Figure 5:
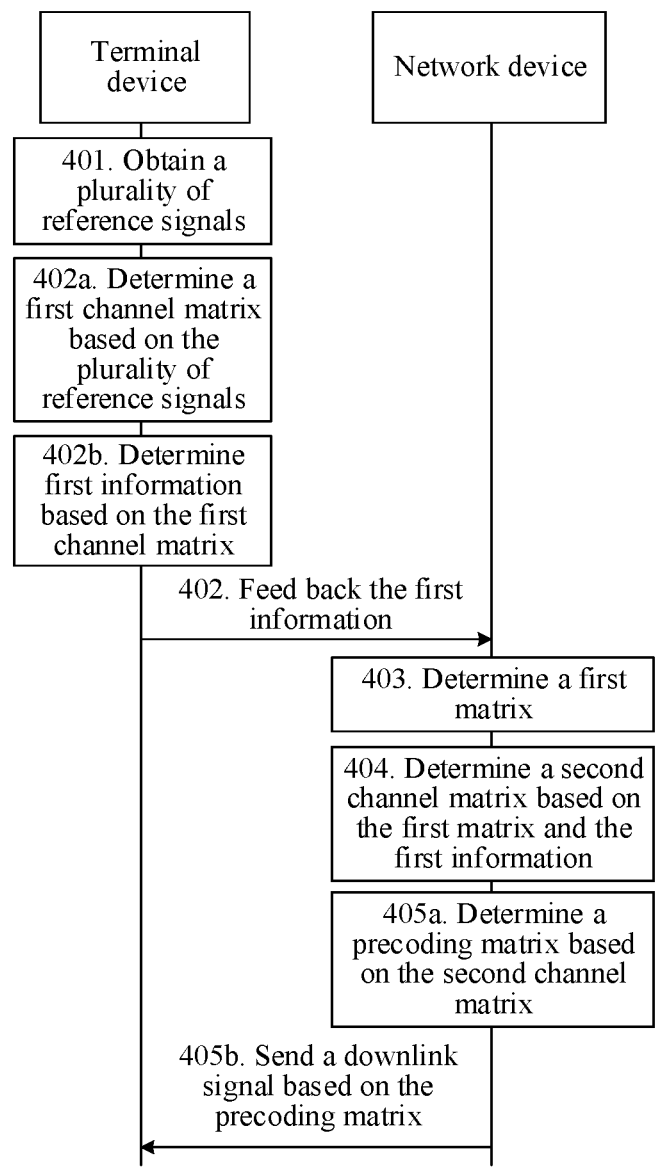
FIG. 5 is a flowchart of a channel matrix determining method according to an embodiment of this application.

In some embodiments, with reference to FIG. 5, before feeding back the first information to the network device, the terminal device may perform the following operation 402*a* to determine the first channel matrix based on the plurality of reference signals, and perform the following operation 402*b* to determine the first information based on the first channel matrix.

Operation 402*a*: The terminal device determines the first channel matrix based on the plurality of reference signals.

For example, the terminal device may measure, based on a CSI-RS configuration and each reference signal, the channel corresponding to the terminal device, to obtain a channel element that is in the first channel matrix and that corresponds to each reference signal.

The CSI-RS configuration may include one or more of the following: a time-frequency resource density, an antenna port/beam quantity, a CSI-RS resource used for channel measurement, a CSI-RS resource used for interference measurement, a CSI-RS resource used for beam tracking, and the like. In some embodiments, the time-frequency resource density may include sparseness, denseness, and the like. The antenna port/beam quantity may include 4, 8, 16, 32, 64, and the like. Alternatively, the CSI-RS configuration may not be limited to the foregoing description, for example, may be a CSI-RS configuration in a protocol 38.331, or may be another CSI-RS configuration. This is not limited.

It should be noted that the CSI-RS configuration may be sent by the network device to the terminal device, or may be pre-specified in a communications protocol. This is not limited.

For example, the network device serves k terminal devices. Each terminal device may receive k reference signals, and the k reference signals may include one wanted signal and k−1 interfering signals. For a terminal device i, the terminal device i may determine a channel element $H_{i1}$ based on a reference signal 1, determine a channel element $H_{i2}$ based on a reference signal 2, . . . , and determine a channel element $H_{ik}$ based on a reference signal k, where $1 \leq i \leq k$. That is, a first channel matrix corresponding to a terminal device 1 may be $[H_{11}\ H_{12}\ \ldots\ H_{1k}]$, a first channel matrix corresponding to a terminal device 2 may be $[H_{21}\ H_{22}\ \ldots\ H_{2k}]$, . . . , and a first channel matrix corresponding to a terminal device k may be $[H_{k1}\ H_{k2}\ \ldots\ H_{kk}]$.

It should be noted that, for a description of determining, by the terminal device, the first channel matrix based on the CSI-RS configuration and the reference signal, refer to related description of determining, by a terminal device, a channel matrix based on a reference signal in a conventional technology. Details are not described.

Operation 402*b*: The terminal device determines the first information based on the first channel matrix.

For example, each terminal device may determine, based on signal strength and/or time-frequency resources of received reference signals, some channel elements corresponding to the terminal device, and determine first information based on the some channel elements.

In some embodiments, the terminal device determines, based on the signal strength and/or the time-frequency resources of the received reference signals by using any one of the following method 1 to method 4, the some channel elements corresponding to the terminal device.

Method 1: Each terminal device may determine, based on the signal strength of the received reference signals, channel elements corresponding to reference signals whose signal strength is greater than a preset threshold as the some channel elements.

The signal strength may be reference signal received quality (RSRQ), or may be reference signal received power (RSRP), or may be a signal to noise ratio (SNR) of the received signal, or may be another parameter that may be used to indicate signal strength or signal quality. This is not limited.

For example, reference signals received by a terminal device 1 include a reference signal 1, a reference signal 2, a reference signal 3, and a reference signal 4, and a first channel matrix determined by the terminal device based on the reference signals is $[H_{11}\ H_{12}\ H_{13}\ H_{14}]$. Assuming that signal strength of the reference signal 1 and signal strength of the reference signal 3 are greater than the preset threshold, the terminal device may determine $H_{11}$ and $H_{13}$ as the some channel elements.

It should be noted that the preset threshold may be sent by the network device to the terminal device, or may be pre-specified in a communications protocol, or may be determined by the terminal device. This is not limited.

Method 2: Each terminal device may sort the received reference signals in descending order of the signal strength of the reference signals, and determine channel elements corresponding to the first N reference signals as the some channel elements.

For example, reference signals received by a terminal device 1 include a reference signal 1, a reference signal 2, a reference signal 3, and a reference signal 4, and a first channel matrix determined by the terminal device based on the reference signals is $[H_{11}\ H_{12}\ H_{13}\ H_{14}]$. Assuming that a result of sorting, by the terminal device, the reference signals in descending order of signal strength is the reference signal 1>the reference signal 3>the reference signal 4>the reference signal 2, and N=3, the terminal device may determine $H_{11}$, $H_{13}$, and $H_{14}$ as the some channel elements.

Method 3: Each terminal device may determine the some channel elements based on the time-frequency resources corresponding to the received reference signals.

For example, the terminal device may determine, based on time-frequency resources pre-indicated by the network device, channel elements corresponding to reference signals on the time-frequency resources as the some channel elements.

For example, the time-frequency resources pre-indicated by the network device include a time-frequency resource 1 and a time-frequency resource 2. The terminal device may determine a channel element corresponding to a reference signal on the time-frequency resource 1 and a channel element corresponding to a reference signal on the time-frequency resource 2 as the some channel elements.

It should be noted that, when the network device indicates the time-frequency resources to the terminal device, the network device may indicate the time-frequency resources to the terminal device based on a time-frequency resources corresponding to a wanted signal corresponding to the terminal device and a time-frequency resource adjacent to the time-frequency resource of the wanted signal, to improve accuracy of a second channel matrix determined by the network device based on the some channel elements fed back by the terminal device, thereby improving accuracy of a precoding matrix determined by the network device based on the second channel matrix, and improving communications quality of a communications system.

In another example, the terminal device may determine, based on a time-frequency resource that is of a wanted signal and that is pre-indicated by the network device, a channel element corresponding to a reference signal on the time-frequency resource as the some channel elements, or determine the channel element corresponding to the reference signal on the time-frequency resource and a channel element corresponding to a reference signal on a time-frequency resource adjacent to the time-frequency resource as the some channel elements.

For example, the time-frequency resource that is of the wanted signal and that is pre-indicated by the network device is a time-frequency resource 1. The terminal device may determine a channel element corresponding to a reference signal on the time-frequency resource 1 as the some channel elements, or determine the channel element corresponding to the reference signal on the time-frequency resource 1 and a channel element corresponding to a reference signal on a time-frequency resource adjacent to the time-frequency resource 1 as the some channel elements.

Method 4: Each terminal device may combine the foregoing method 1 to method 3, that is, each terminal device may determine the some channel elements based on one or more of the foregoing method 1 to method 3.

It should be noted that, in the foregoing method 1 to method 4, when a quantity of channel elements included in the some channel elements is 1, the channel element may be a first channel element. The first channel element corresponds to a first reference signal, and the first reference signal is a reference signal with maximum signal strength in the plurality of reference signals, or the first reference signal is a reference signal on a preset time-frequency resource. The preset time-frequency resource may be the time-frequency resource of the wanted signal. The first reference signal may also be described as a wanted signal. This is not limited.

Based on the foregoing method 1 to method 4, the terminal device selects, from the first channel matrix based on the signal strength and/or the time-frequency resources, a channel element corresponding to a reference signal with higher signal strength and/or a channel element corresponding to a reference signal on a time-frequency resource that is the same as or close to the time-frequency resource of the wanted signal as the some channel elements. This can improve accuracy of the second channel matrix determined by the network device based on the some channel elements fed back by the terminal device, thereby improving accuracy of the precoding matrix determined by the network device based on the second channel matrix, and improving communications quality of a communications system.

In some embodiments, the terminal device receives second indication information sent by the network device. The second indication information indicates a quantity of channel elements included in the some channel elements. The terminal device determines the some channel elements based on the second indication information.

For example, the network device may add a field to a CSI-Report Config information element to represent the second indication information.

For example, an information element format of the CSI-Report Config information element may be as follows:
-- ASNI START
-- TAG-CSI-REPORT CONFIG-START
CSI-Report Config::=SEQUENCE { . . .
csi-Channel Element Number Reporting :INTEGER (0 . . . 7)

Alternatively, the quantity N of channel elements included in the some channel elements is pre-specified in a communications protocol, or the quantity N of channel elements included in the some channel elements is determined by the terminal device. This is not limited.

In some embodiments, each terminal device determines, in any one of the following manner 1 to manner 7, the first information based on the some channel elements determined by the terminal device.

Manner 1: The first information may include the some channel elements.

For example, the first channel matrix corresponding to the terminal device 1 is $[H_{11}\ H_{12}\ H_{13}\ H_{14}]$, and the some channel elements determined by the terminal device 1 include $H_{11}$ and $H_{13}$. The terminal device 1 may add $H_{11}$ and $H_{13}$ to the first information and send the first information to the network device. For example, the first channel matrix corresponding to the terminal device 2 is $[H_{21}\ H_{22}\ H_{23}\ H_{24}]$, and the some channel elements determined by the terminal device 2 include $H_{21}$ and $H_{22}$. The terminal device 2 may add $H_{21}$ and $H_{22}$ to the first information and send the first information to the network device.

Manner 2: The first information may include a channel parameter corresponding to each of the some channel elements.

The channel parameter may be used to determine the channel element corresponding to the channel parameter.

In some embodiments, the terminal device may send, to the network device, the channel parameter corresponding to each of the some channel elements, so that the network device restores the channel element based on the channel parameter, thereby reducing feedback overheads of the terminal device.

For example, the channel parameter may include $i_{1,1}$ and $i_{1,2}$, a value of $i_{1,1}$ may be 0, 1, 2, . . . , $N_{1,1}$, and a value of $i_{1,2}$ may be 0, 1, 2, . . . , $N_{1,2}$.

For example, the first channel matrix corresponding to the terminal device 1 is $[H_{11}\ H_{12}\ H_{13}\ H_{14}]$, and the some channel elements determined by the terminal device 1 include $H_{11}$. Assuming $H_{11}=\alpha_{1,1}\cdot i_{1,1}\cdot e^{j\alpha_{1,2}\cdot i_{1,2}}$, the terminal device may send values of $i_{1,1}$ and $i_{1,2}$ to the network device, so that the network device determines $H_{11}$ based on $i_{1,1}$ and $i_{1,2}$. $\alpha_{1,1}$ and $\alpha_{1,2}$ are precision. The precision may be pre-specified in a communications protocol, may be sent by the network device to the terminal device, or may be fed back by the terminal device based on a terminal capability of the terminal device. This is not limited.

Manner 3: When the some channel elements include the first channel element and at least one second channel element, the first information may include a first coefficient corresponding to each second channel element and the first channel element.

The first channel element may correspond to the first reference signal, and the first reference signal may be the reference signal with the maximum signal strength in the plurality of reference signals; or the first reference signal is the reference signal on the preset time-frequency resource. The first coefficient may be used to determine, based on the first channel element, the second channel element corresponding to the first coefficient. Alternatively, in other words, the first channel element is the channel element corresponding to the wanted signal, and the second channel element is a channel element corresponding to an interfering signal. This is not limited.

In some embodiments, the terminal device adds the first coefficient corresponding to each second channel element and the first channel element in the some channel elements to the first information, and sends the first information to the network device, so that the network device may restore each second channel element based on the first channel element and the first coefficient corresponding to each second channel element, thereby reducing feedback overheads of the terminal device.

For example, the some channel elements determined by the terminal device include the first channel element, a second channel element 1, and a second channel element 2. The terminal device may determine, based on the first channel element and the second channel element 1, a first coefficient 1 corresponding to the second channel element 1, determine, based on the first channel element and the second channel element 2, a first coefficient 2 corresponding to the second channel element 2, and add the first channel element, the first coefficient 1, and the first coefficient 2 to the first information and send the first information to the network device.

For example, the some channel elements determined by the terminal device 1 include $H_{11}$, $H_{12}$, and $H_{13}$, the first channel element is $H_{11}$, and the second channel element includes $H_{12}$ and $H_{13}$. Assuming $H_{12}=i_2 H_{11}$ and $H_{13}=i_3 H_{11}$, the terminal device may determine $i_2$ as a first coefficient corresponding to $H_{12}$, and determine $i_3$ as a first coefficient corresponding to $H_{13}$. In this case, the terminal device may add $H_{11}$, $i_2$, and $i_3$ to the first information, and send the first information to the network device, so that the network device determines $H_{11}$, $H_{12}$, and $H_{13}$ based on $H_{11}$, $i_2$, and $i_3$. A value of $i_2$ may be 0, 1, 2, . . . , $N_2$, and a value of $i_3$ may be 0, 1, 2, . . . , $N_3$.

In some embodiments, the terminal device feeds back the first information to the network device in a form of a channel element codebook, and the first information may be a channel element codebook 1 shown in the following Table 3:

TABLE 3

| Channel element codebook 1 | | |
| --- | --- | --- |
|  | $i_2$ | $i_3$ |
| $H_{11}$ | 0, 1, 2, . . . , $N_2$ | 0, 1, 2, . . . , $N_3$ |

In another example, the some channel elements determined by the terminal device include the first channel element, a second channel element 1, and a second channel element 2. The terminal device may determine, based on the first channel element and the second channel element 1, a first coefficient 1 corresponding to the second channel element 1, determine, based on the first channel element, the second channel element 1, and the second channel element 2, a first coefficient 2 corresponding to the second channel element 2, and add the first channel element, the first coefficient 1, and the first coefficient 2 to the first information and send the first information to the network device.

For example, the some channel elements determined by the terminal device 1 include $H_{11}$, $H_{12}$, $H_{13}$, and $H_{14}$, the first channel element is $H_{11}$, and the second channel element includes $H_{12}$, $H_{13}$, and $H_{14}$. Assuming $H_{12}=i_2 H_{11}$, $H_{13}=i_3 H_{12}$, and $H_{14}=i_4 H_{13}$, the terminal device may determine $i_2$ as a first coefficient corresponding to $H_{12}$, determine $i_3$ as a first coefficient corresponding to $H_{13}$, and determine $i_4$ as a first coefficient corresponding to $H_{14}$. In this case, the terminal device may add $H_{11}$, $i_2$, $i_3$, and $i_4$ to the first information, and send the first information to the network device, so that the network device determines $H_{11}$, $H_{12}$, $H_{13}$, and $H_{14}$ based on $H_{11}$, $i_2$, $i_3$, and $i_4$. A value of $i_2$ may be 0, 1, 2, . . . , $N_2$, a value of $i_3$ may be 0, 1, 2, . . . , $N_3$, and a value of $i_4$ may be 0, 1, 2, . . . , $N_4$.

In some embodiments, the terminal device feeds back the first information to the network device in a form of a channel element codebook, and the first information may be a channel element codebook 2 shown in the following Table 4:

TABLE 4

| Channel element codebook 2 | | | |
| --- | --- | --- | --- |
|  | $i_2$ | $i_3$ | $i_4$ |
| $H_{11}$ | 0, 1, 2, . . . , $N_2$ | 0, 1, 2, . . . , $N_3$ | 0, 1, 2, . . . , $N_4$ |

Manner 4: The first information may include a first coefficient corresponding to each second channel element and a channel parameter of the first channel element.

For description of the first channel element, refer to the description of the first channel element in the foregoing manner 3. For description of the channel parameter, refer to the description of the channel parameter in the foregoing manner 2. Details are not described again.

In some embodiments, the terminal device sends, to the network device, the first coefficient corresponding to each second channel element and the channel parameter of the first channel element, so that the network device may determine the first channel element based on the channel parameter of the first channel element, and restore the second channel element based on the first channel element and the first coefficient corresponding to the second channel element, thereby reducing feedback overheads of the terminal device.

For example, the some channel elements determined by the terminal device 1 include $H_{11}$, $H_{12}$, and $H_{13}$, the first channel element is $H_{11}$, and the second channel element includes $H_{12}$ and $H_{13}$. Assuming $H_{11}=\alpha_{1,1} \cdot i_{1,1} \cdot e^{j\alpha_{1,2} \cdot i_{1,2}}$, $H_{12}=i_2 H_{11}$, and $H_{13}=i_3 H_{11}$, the terminal device may determine $i_{1,1}$ and $i_{1,2}$ as a channel parameter of $H_{11}$, determine $i_2$ as a first coefficient corresponding to $H_{12}$, and determine $i_3$ as a first coefficient corresponding to $H_{13}$. In this case, the terminal device may add $i_{1,1}$, $i_{1,2}$, $i_2$, and $i_3$ to the first information, and send the first information to the network device, so that the network device determines $H_{11}$ based on $i_{1,1}$ and $i_{1,2}$, and determines $H_{12}$ and $H_{13}$ based on $H_{11}$, $i_2$, and $i_3$. A value of $i_{1,1}$ may be 0, 1, 2, . . . , $N_{1,1}$, a value of $i_{1,2}$ may be 0, 1, 2, . . . , $N_{1,2}$, a value of $i_2$ may be 0, 1, 2, . . . , $N_2$, and a value of $i_3$ may be 0, 1, 2, . . . , $N_3$.

In some embodiments, the terminal device feeds back the first information to the network device in a form of a channel element codebook, and the first information may be a channel element codebook 3 shown in the following Table 5:

TABLE 5

Channel element codebook 3

| $i_{1,1}$ | $i_{1,2}$ | $i_2$ | $i_3$ |
|---|---|---|---|
| 0, 1, 2, . . . , $N_{1,1}$ | 0, 1, 2, . . . , $N_{1,2}$ | 0, 1, 2, . . . , $N_2$ | 0, 1, 2, . . . , $N_3$ |

For another example, the some channel elements determined by the terminal device 1 include $H_{11}$, $H_{12}$, $H_{13}$, and $H_{14}$, the first channel element is $H_{11}$, and the second channel element includes $H_{12}$, $H_{13}$, and $H_{14}$. Assuming $H_{11}=\alpha_{1,1} \cdot i_{1,1} \cdot e^{j\alpha_{1,2} \cdot i_{1,2}}$, $H_{12}=i_2 H_{11}$, $H_{13}=i_3 H_{12}$, and $H_{14}=i_4 H_{13}$, the terminal device may determine $i_{1,1}$ and $i_{1,2}$ as a channel parameter of $H_{11}$, determine $i_2$ as a first coefficient corresponding to $H_{12}$, determine $i_3$ as a first coefficient corresponding to $H_{13}$, and determine $i_4$ as a first coefficient corresponding to $H_{14}$. In this case, the terminal device may add $i_{1,1}$, $i_{1,2}$, $i_2$, $i_3$, and $i_4$ to the first information, and send the first information to the network device, so that the network device determines $H_{11}$ based on $i_{1,1}$ and $i_{1,2}$, and determines $H_{12}$, $H_{13}$, and $H_{14}$ based on $H_{11}$, $i_2$, $i_3$, and $i_4$. A value of $i_{1,1}$ may be 0, 1, 2, . . . , $N_{1,1}$, a value of $i_{1,2}$ may be 0, 1, 2, . . . , $N_{1,2}$, a value of $i_2$ may be 0, 1, 2, . . . , $N_2$, a value of $i_3$ may be 0, 1, 2, . . . , $N_3$, and a value of $i_4$ may be 0, 1, 2, . . . , $N_4$.

In some embodiments, the terminal device feeds back the first information to the network device in a form of a channel element codebook, and the first information may be a channel element codebook 4 shown in the following Table 6:

TABLE 6

Channel element codebook 4

| $i_{1,1}$ | $i_{1,2}$ | $i_2$ | $i_3$ | $i_4$ |
|---|---|---|---|---|
| 0, 1, 2, . . . , $N_{1,1}$ | 0, 1, 2, . . . , $N_{1,2}$ | 0, 1, 2, . . . , $N_2$ | 0, 1, 2, . . . , $N_3$ | 0, 1, 2, . . . , $N_4$ |

It should be noted that the first coefficient in the foregoing manner 3 and manner 4 may also be described as an attenuation coefficient of the second channel element relative to the first channel element. This is not limited.

Manner 5: The first information may include a channel coefficient. The channel coefficient may be determined based on the first channel element and a first coupling loss corresponding to the first channel element.

For description of the first channel element, refer to the description of the first channel element in the foregoing manner 3. Details are not described again.

The first channel element may correspond to the first reference signal, and the first coupling loss may also correspond to the first reference signal. Alternatively, in other words, the first channel element and the first coupling loss that correspond to the terminal device both correspond to the wanted signal corresponding to the terminal device.

For example, the channel coefficient may be a quotient of the first channel element and the first coupling loss corresponding to the first channel element.

In some embodiments, the terminal device determines, based on an antenna gain of the wanted signal, an antenna gain of the terminal device, location information of the terminal device, location information of the network device, and a center frequency of the beam corresponding to the terminal device, the first coupling loss corresponding to the wanted signal.

It should be noted that the antenna gain of the wanted signal may also be described as an antenna gain of the network device.

For example, the terminal device k may determine, based on the following formula, a first coupling loss $F_{kk}$ corresponding to the wanted signal k corresponding to the terminal device k:

$$F_{kk} = \frac{Gt_k Gr_k}{PL_k},$$

where $PL_k = 10^{32.45 + 20 \, log \, 10(f_c) + 20 \, log \, 10(d)}$.

$Gt_k$ represents an antenna gain of the wanted signal k, and the antenna gain may be used as a fixed parameter of an antenna of the network device. $Gr_k$ represents an antenna gain of the terminal device, and the antenna gain may be a fixed parameter of an antenna of the terminal device. $PL_k$ represents a free path pass loss, $f_c$ represents a center frequency of a beam corresponding to the terminal device, d indicates a distance between the terminal device and the network device, and the terminal device may determine d based on location information of the terminal device and the location information of the network device.

Alternatively, the terminal device determines, based on the antenna gain of the wanted signal, the location information of the terminal device, the location information of the network device, and the center frequency of the beam corresponding to the terminal device, the first coupling loss corresponding to the wanted signal.

It should be noted that the antenna gain of the wanted signal may also be described as an antenna gain of the network device.

For example, the terminal device k may determine, based on the following formula, a first coupling loss $F_{kk}$ corresponding to the wanted signal k corresponding to the terminal device k:

$$F_{kk} = \frac{Gt_k}{PL_k},$$

where $PL_k = 10^{32.45 + 20 \, log \, 10(f_c) + 20 \, log \, 10(d)}$.

$Gt_k$ represents an antenna gain of the wanted signal k, and the antenna gain may be used as a fixed parameter of an antenna of the network device. $PL_k$ represents a free path pass loss, $f_c$ represents a center frequency of a beam corresponding to the terminal device, d indicates a distance between the terminal device and the network device, and the terminal device may determine d based on location information of the terminal device and the location information of the network device.

Alternatively, the terminal device determines, based on the location information of the terminal device, the location information of the network device, and the center frequency of the beam corresponding to the terminal device, the first coupling loss corresponding to the wanted signal.

For example, the terminal device k may determine, based on the following formula, a first coupling loss $F_{kk}$ corresponding to the wanted signal k corresponding to the terminal device k:

$$F_{kk}=PL_k,$$

where $PL_k=10^{32.45+20\ log\ 10(f_c)+20\ log\ 10(d)}$.

$PL_k$ represents a free path pass loss, $f_c$ represents a center frequency of a beam corresponding to the terminal device, d indicates a distance between the terminal device and the network device, and the terminal device may determine d based on location information of the terminal device and the location information of the network device.

It should be noted that, in this embodiment of this application, in the communications systems shown in FIG. 1d to FIG. 1f, the location information of the network device may be location information of the high-altitude platform station, the distance between the terminal device and the network device, and location information between the terminal device and the high-altitude platform station.

For example, the terminal device feeds back a complete channel matrix. Assuming that the network device serves k terminal devices, the network device may send k reference signals to the k terminal devices, and obtain the following ideal channel matrix H based on complete channel matrices fed back by the k terminal devices. The channel matrix H may include a small-scale channel matrix S and a large-scale channel matrix L:

$$H = S^T \cdot L = \begin{bmatrix} S_1F_{11}\alpha_1 S_1F_{12}\alpha_1 & \ldots & S_1F_{1k}\alpha_1 \\ S_2F_{21}\alpha_2 S_2F_{22}\alpha_2 & \ldots & S_2F_{2k}\alpha_2 \\ S_3F_{31}\alpha_3 S_3F_{32}\alpha_3 & \ldots & S_3F_{3k}\alpha_3 \\ & \ldots & \\ S_{kk}F_{k1}\alpha_k S_kF_{k2}\alpha_k & \ldots & S_kF_{kk}\alpha_k \end{bmatrix}.$$

A channel element included in each row of the channel matrix H is equal to a channel element included in a first channel matrix corresponding to each terminal device. $S_1F_{11}\alpha_1$ represents a channel element $H_{11}$ determined by a terminal device 1 based on a received reference signal 1, $S_1F_{12}\alpha_1$ represents a channel element $H_{12}$ determined by the terminal device 1 based on a received reference signal 2, ..., and $S_1F_{1k}\alpha_1$ represents a channel element $H_{1k}$ determined by the terminal device 1 based on a received reference signal k. $S_2F_{21}\alpha_2$ represents a channel element $H_{21}$ determined by a terminal device 2 based on a received reference signal 1, $S_2F_{22}\alpha_2$ represents a channel element $H_{22}$ determined by the terminal device 2 based on a received reference signal 2, ..., and $S_2F_{2k}\alpha_2$ represents a channel element $H_{2k}$ determined by the terminal device 2 based on a received reference signal k; and so on. $S_kF_{k1}\alpha_k$ represents a channel element $H_k$i determined by a terminal device k based on a received reference signal 1, $S_kF_{k2}\alpha_k$ represents a channel element $H_{k2}$ determined by the terminal device k based on a received reference signal 2, ..., and $S_kF_{kk}\alpha_k$ represents a channel element $H_{kk}$ determined by the terminal device k based on a received reference signal k. That is, the first channel matrix corresponding to each terminal device includes a channel element corresponding to a wanted signal corresponding to the terminal device and channel elements corresponding to k–1 interfering signals corresponding to the terminal device.

In some embodiments, each channel element may include a small-scale channel matrix S and a large-scale channel matrix L.

For a same terminal device, a wanted signal and an interfering signal pass through a same small-scale channel. Therefore, for the same terminal device, small-scale channel matrices S of channel elements corresponding to the wanted signal and the interfering signal are the same.

The large-scale channel may include a coupling loss parameter F and a random loss parameter $\alpha$. The random loss parameter $\alpha$ is mainly determined by fading that randomly changes with time, such as atmospheric absorption, shadow fading, or hardware introduction. Therefore, for a same terminal device, random loss parameters $\alpha$ of channel elements corresponding to a wanted signal and an interfering signal are the same.

For the terminal device k, coupling losses experienced by a wanted signal and an interfering signal are different, and are respectively $F_{k1}$ $F_{k2}$ ... $F_{kk}$. The terminal device may determine, with reference to the foregoing description of the first coupling loss, a coupling loss $F_{kk}$ corresponding to the wanted signal, and determine, based on the following formula, a coupling loss $F_{ki}$ corresponding to the interfering signal:

$$F_{ki} = \frac{Gt_{ki}Gr_k}{PL_k},$$

where $PL_k=PL_k=10^{32.45+20\ log\ 10(f_c)+20\ log\ 10(d)}$.

$Gt_{ki}$ is used to represent an antenna gain of a terminal device i in a communications direction of the terminal device k. The terminal device i may be any terminal device other than the terminal device k in the k terminal devices. The antenna gain may be determined based on a communications angle between the terminal device i and the terminal device k. The communications angle between the terminal device i and the terminal device k may be an angle between a line segment formed by the terminal device i and the network device and a line segment formed by the terminal device k and the network device. For description of another parameter in the foregoing formula, refer to the related description of $F_{kk}$. Details are not described again.

Figure 6:
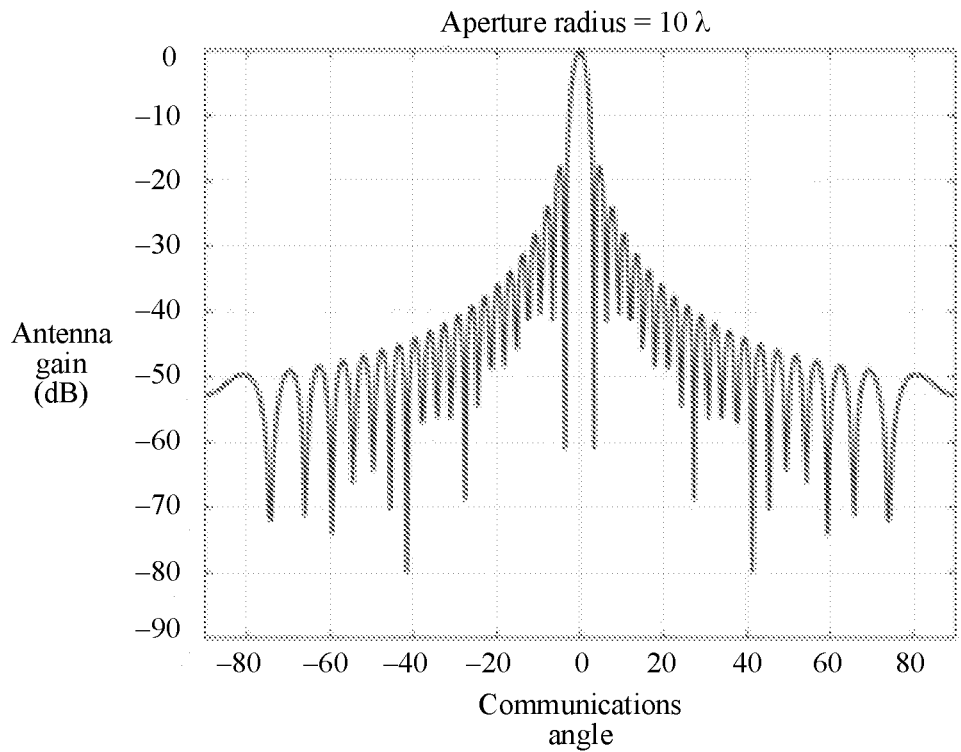
FIG. 6 is a curve diagram of a correspondence between a communications angle and an antenna gain according to an embodiment of this application.

For example, the terminal device may determine, in a table lookup manner, the antenna gain of the terminal device i in the communications direction of the terminal device k based on the communications angle between the terminal device i and the terminal device k with reference to a correspondence shown in FIG. 6 between a communications angle and an antenna gain.

In some embodiments, the terminal device k may determine the communications angle between the terminal device i and the terminal device k based on location information of the terminal device i, location information of the terminal device k, and the location information of the network device.

It should be noted that, with reference to the communications systems shown in FIG. 1d and FIG. 1e, the communications angle between the terminal device i and the terminal device k may be an angle between a line segment formed by the terminal device i and the high-altitude platform station of the network device and a line segment formed by the terminal device k and the high-altitude platform station of the network device.

Based on the foregoing description of the ideal channel matrix H, for the terminal device k, assuming that the wanted signal corresponding to the terminal device k is the reference signal k, the terminal device k may determine, at operation 402a, a first channel element $H_{kk}$ corresponding to the wanted signal, determine, based on an antenna gain of the wanted signal, an antenna gain of the terminal device k, the location information of the terminal device k, the location information of the network device, and a center frequency of a beam corresponding to the terminal device k, a first coupling loss $F_{kk}$ corresponding to the wanted signal, and send a quotient $S_k\alpha_k$ of the first channel element $H_{kk}$ and the first coupling loss $F_{kk}$ as a channel coefficient to the network device, so that the network device determines a second channel matrix based on the channel coefficient.

Manner 6: The first information may include a channel coefficient. The channel coefficient may be an average value of quotients of channel elements in the first channel matrix and coupling losses corresponding to the channel elements.

Reference signals corresponding to the channel elements are the same as reference signals corresponding to the coupling losses corresponding to the channel elements.

In some embodiments, the terminal device may determine, based on the method described in the foregoing manner 5, the coupling losses corresponding to the channel elements, and feed back the average value $S_k\alpha_k$ of the quotients of the channel elements and the coupling losses corresponding to the channel elements as the channel coefficient to the network device, thereby improving accuracy of the channel coefficient fed back by the terminal device.

For example, the first channel matrix corresponding to the terminal device is $[H_{11}\ H_{12}\ H_{13}\ H_{14}]$. Based on the method described in the foregoing manner 5, the terminal device may determine a coupling loss $F_{11}$ corresponding to a reference signal corresponding to $H_{11}$, a coupling loss $F_{12}$ corresponding to a reference signal corresponding to $H_{12}$, a coupling loss $F_{13}$ corresponding to a reference signal corresponding to $H_{13}$, and a coupling loss $F_{14}$ corresponding to a reference signal corresponding to $H_{14}$, and feed back an average value $S_1\alpha_1$ of $H_{11}/F_{11}$, $H_{12}/F_{12}$, $H_{13}/F_{13}$, and $H_{14}/F_{14}$ as the channel coefficient to the network device.

It should be noted that, in the foregoing manner 5 and manner 6, the terminal device may calculate, based on the foregoing formula, a coupling loss corresponding to each reference signal, or may receive a coupling loss that corresponds to each reference signal and that is sent by the network device. This is not limited.

When the terminal device determines the channel coefficient based on the coupling loss that corresponds to each reference signal and that is sent by the network device, accuracy of the channel coefficient can be improved, thereby improving accuracy of the second channel matrix determined by the network device based on the channel coefficient.

Based on the foregoing manner 5 and manner 6, the terminal device feeds back the channel element to the network device by using the channel coefficient, so that feedback overheads of the terminal device can be reduced.

Manner 7: The first information may include an indication parameter corresponding to a channel coefficient.

The indication parameter may be used to determine the channel coefficient. For description of the channel coefficient, refer to the description of the channel coefficient in the foregoing manner 5 or manner 6. Details are not described again.

For example, the terminal device may indicate the channel coefficient by using one or more indication parameters, and feed back the indication parameter of the channel coefficient to the network device, so that feedback overheads of the terminal device can be reduced.

For example, the channel coefficient is $S_k\alpha_k = a0i_0 + a1i_1 + a2i_2 + a3i_3$. The terminal device may feed back $i_0$, $i_1$, $i_2$, and $i_3$ to the network device. a0, a1, a2, and a3 respectively represent coefficients corresponding to $i_0$, $i_1$, $i_2$, and $i_3$. A value of $i_0$ may be 0, 1, 2, . . . , $N_0$, a value of $i_1$ may be 0, 1, 2, . . . , $N_1$, a value of $i_2$ may be 0, 1, 2, . . . , $N_2$, and a value of $i_3$ may be 0, 1, 2, . . . $N_3$.

It should be noted that, a0, a1, a2, and a3 may be pre-specified in a communications protocol, or may be sent by the network device to the terminal device.

In some embodiments, the terminal device may feed back the indication parameter corresponding to the channel coefficient to the network device in a manner shown in Table 7.

TABLE 7

| $i_0$ | $i_1$ | $i_2$ | $i_3$ |
|---|---|---|---|
| 0, 1, 2, . . . , $N_0$ | 0, 1, 2, . . . , $N_1$ | 0, 1, 2, . . . , $N_2$ | 0, 1, 2, . . . , $N_3$ |

In some embodiments, based on the foregoing manner 1 to manner 7, the terminal device receives first indication information from the network device, and feeds back the first information to the network device in a feedback manner indicated by the first indication information.

The first indication information indicates a feedback manner in which the terminal device feeds back the first information. The feedback manner includes one or more of the following: feeding back the first information based on a channel element (which may also be described as feeding back the first information based on the foregoing manner 1), feeding back the first information based on a channel parameter of a channel element (which may also be described as feeding back the first information based on the foregoing manner 2), feeding back the first information based on a channel element and a first coefficient (which may also be described as feeding back the first information based on the foregoing manner 3), feeding back the first information based on a channel parameter of a channel element and a first coefficient (which may also be described as feeding back the first information based on the foregoing manner 4), feeding back the first information based on a channel coefficient (which may also be described as feeding back the first information based on the foregoing manner 5 or manner 6), and feeding back the first information based on an indication parameter of a channel coefficient (which may also be described as feeding back the first information based on the foregoing manner 7).

Alternatively, the terminal device feeds back the first information in a feedback manner pre-specified in a communications protocol, or the terminal device determines, based on a terminal capability, a feedback manner in which the terminal device feeds back the first information.

It should be noted that in this embodiment of this application, the terminal device may determine the location information of the terminal device based on a positioning unit of the terminal device. The positioning unit may be a positioning unit that can position the terminal device, such as a global positioning system (GPS) unit or a beidou navigation satellite system (BDS) unit. This is not limited.

Alternatively, when the terminal device does not have a positioning function, or the terminal device has a positioning function but has a relatively poor positioning capability, the terminal device determines a first beam based on beam sweeping, and determines the location information of the terminal device based on location information of the first beam on ground.

The first beam is a beam with maximum signal strength in beams corresponding to the beam sweeping.

In some embodiments, the network device may generate a plurality of beams in a time division manner, and each beam may correspond to one reference signal. The network device may send reference signals to the terminal device over the plurality of beams, so that the terminal device determines the first beam based on signal strength of received reference signals, and sends related information of the first beam to the network device.

The related information of the first beam may be one or more of the following: a beam identifier of the first beam, a timestamp of the first beam, and a time-frequency resource of the first beam.

For example, the beam identifier of the first beam may be a beam identifier that may be used to identify the first beam, such as a beam number or a beam ID of the first beam. This is not limited.

It should be noted that the network device may send, to the terminal device through radio resource control (RRC) signaling, a resource of a reference signal corresponding to each beam, so that the terminal device measures the reference signal based on the resource of the reference signal.

In some embodiments, the terminal device may further receive location information of another terminal device that is sent by the another terminal device, to determine the foregoing coupling loss based on the location information of the another terminal device.

Alternatively, when the another terminal device does not have a positioning function, or has a positioning function but has a relatively poor positioning capability, or does not have a capability to report the location information, the terminal device receives the location information of the another terminal device that is sent by the network device.

In some embodiments, the network device may determine location information of each terminal device with reference to the foregoing description of beam sweeping, and send the location information to each terminal device.

In some embodiments, the terminal device further receives the location information of the network device that is sent by the network device.

The location information of the network device may be location information of the high-altitude platform station.

In some embodiments, the network device may determine the location information of the network device based on ephemeris information of the high-altitude platform station. The ephemeris information may be used to indicate a precise location changing with time or a track chart of a space vehicle (for example, the high-altitude platform station) running, and is used to describe a location and a speed of the space vehicle. For example, parameters such as a time, a location, and a speed of the space vehicle may be determined based on the ephemeris information by using a mathematical relationship between six orbital parameters of Kepler's laws.

It should be noted that, for a description of determining, by the network device, the location information of the space vehicle based on the ephemeris information, refer to a conventional technology. Details are not described.

Operation 403: The network device determines a first matrix.

For example, the network device serves k terminal devices, and the network device sends k reference signals to the k terminal devices. The first matrix may be a k*k matrix. An $(ij)^{th}$ element in the first matrix indicates a coupling loss of a terminal device i corresponding to a reference signal j, or the $(ij)^{th}$ element in the first matrix indicates a coupling loss of a reference signal i relative to a terminal device j. This is not limited. $1 \le i \le k$, and $1 \le j \le k$.

In some embodiments, with reference to the description of the coupling loss in the foregoing manner 5, the network device may determine, based on an antenna gain of each reference signal, an antenna gain of each terminal device, location information of each terminal device, the location information of the network device, and a center frequency of a beam corresponding to each terminal device, a coupling loss of each terminal device corresponding to each reference signal.

For example, the $(ij)^{th}$ element in the first matrix may be used to indicate the coupling loss of the terminal device i corresponding to the reference signal j. The first matrix may be the following matrix:

$$F = \begin{bmatrix} F_{11} F_{12} & \dots & F_{1k} \\ F_{21} F_{22} & \dots & F_{2k} \\ F_{31} F_{32} & \dots & F_{3k} \\ & \dots & \\ F_{k1} F_{k2} & \dots & F_{kk} \end{bmatrix}.$$

$F_{11}$ is used to represent a coupling loss of a terminal device 1 corresponding to a reference signal 1, $F_{12}$ is used to represent a coupling loss of the terminal device 1 corresponding to a reference signal 2, . . . , $F_{1k}$ is used to represent a coupling loss of the terminal device 1 corresponding to a reference signal k, . . . , $F_{k1}$ is used to represent a coupling loss of a terminal device k corresponding to the reference signal 1, $F_{k2}$ is used to represent a coupling loss of the terminal device k corresponding to the reference signal 2, . . . , and $F_{kk}$ is used to represent a coupling loss of the terminal device k corresponding to the reference signal k.

In some embodiments, the network device determines the location information of the network device with reference to the related description of determining the location information of the network device in operation 402. Details are not described again.

In some embodiments, the network device receives the location information of each terminal device that is sent by the terminal device.

Alternatively, when the terminal device does not have a positioning function, or has a positioning function but has a relatively poor positioning capability, or does not have a capability to report location information, the network device may determine the location information of the terminal device based on beam sweeping.

In some embodiments, the network device may determine the location information of the terminal device with reference to the related description of beam sweeping in operation 402. Details are not described again.

It should be noted that a sequence of performing operation 402 and operation 403 is not limited. The network device may first receive, based on operation 402, the first information sent by the terminal device, and then determine the first matrix based on operation 403; or may first determine the first matrix based on operation 403, and then receive, based on operation 402, the first information sent by the terminal device; or perform operation 402 and operation 403 at the same time. This is not limited.

Operation 404: The network device determines the second channel matrix based on the first matrix and the first information.

For example, the network device serves k terminal devices, and the network device sends k reference signals to the k terminal devices. The network device may receive first information fed back by m terminal devices. $1 \leq m \leq k$.

When the network device receives the first information fed back by the m terminal devices, the network device may determine a first matrix of m*m based on the m terminal devices and m wanted signals corresponding to the m terminal devices. An $(ij)^{th}$ element in the first matrix indicates a coupling loss of a terminal device i corresponding to a reference signal j, $1 \leq i \leq m$, and $1 \leq j \leq m$; or the $(ij)^{th}$ element in the first matrix may be used to indicate a coupling loss of a terminal device i corresponding to a reference signal j, $1 \leq i \leq m$, and $1 \leq j \leq m$.

In a possible design, when the terminal device feeds back the first information in the manner 1 to manner 4, the network device replaces, based on a terminal device i corresponding to each channel element and a reference signal j corresponding to the channel element, a coupling loss that is in the first matrix and that corresponds to the terminal device i and the reference signal j with the channel element, to obtain a second channel matrix.

Example 1: For example, the network device receives first information fed back by six terminal devices in the manner 1, first channel matrices corresponding to a terminal device 1 to a terminal device 6 are the following matrix H, and a first matrix determined by the network device based on the terminal device 1 to the terminal device 6 is the following matrix F. A channel element included in a first channel element corresponding to a terminal device i is a channel element in an $i^{th}$ row in the matrix H, and a coupling loss corresponding to the terminal device i is an element in an $i^{th}$ row in the matrix F. It is assumed that first information fed back by a terminal device 1 includes $[H_{11}\ H_{12}\ H_{13}\ H_{14}]$, first information fed back by a terminal device 2 includes $[H_{21}\ H_{22}\ H_{23}\ H_{26}]$, first information fed back by a terminal device 3 includes $[H_{31}\ H_{32}\ H_{33}\ H_{36}]$, first information fed back by a terminal device 4 includes $[H_{41}\ H_{42}\ H_{43}\ H_{44}]$, first information fed back by a terminal device 5 includes $[H_{51}\ H_{53}\ H_{55}\ H_{56}]$, and first information fed back by a terminal device 6 includes $[H_{62}\ H_{64}\ H_{65}\ H_{66}]$. After the network device receives the first information fed back by the terminal device 1 to the terminal device 6, because both $H_{11}$ and $F_{11}$ correspond to the terminal device 1 and a reference signal 1, both $H_{22}$ and $F_{12}$ correspond to the terminal device 1 and a reference signal 2, ..., and both $H_{66}$ and $F_{66}$ correspond to the terminal device 6 and a reference signal 6, the network device may replace, based on the first information and the first matrix, a coupling loss with a channel element, which correspond to a same terminal device and a same reference signal, to determine a second channel matrix, which is the following matrix Hw:

$$H = \begin{bmatrix} H_{11} & H_{12} & H_{13} & H_{14} & H_{15} & H_{16} \\ H_{21} & H_{22} & H_{23} & H_{24} & H_{25} & H_{26} \\ H_{31} & H_{32} & H_{33} & H_{34} & H_{35} & H_{36} \\ H_{41} & H_{42} & H_{43} & H_{44} & H_{45} & H_{46} \\ H_{51} & H_{52} & H_{53} & H_{54} & H_{55} & H_{56} \\ H_{61} & H_{62} & H_{63} & H_{64} & H_{65} & H_{66} \end{bmatrix},$$

and $$F = \begin{bmatrix} F_{11} & F_{12} & F_{13} & F_{14} & F_{15} & F_{16} \\ F_{21} & F_{22} & F_{23} & F_{24} & F_{25} & F_{26} \\ F_{31} & F_{32} & F_{33} & F_{34} & F_{35} & F_{36} \\ F_{41} & F_{42} & F_{43} & F_{44} & F_{45} & F_{46} \\ F_{51} & F_{52} & F_{53} & F_{54} & F_{55} & F_{56} \\ F_{61} & F_{62} & F_{63} & F_{64} & F_{65} & F_{66} \end{bmatrix};$$

and $$Hw = \begin{bmatrix} H_{11} & H_{12} & H_{13} & H_{14} & F_{15} & F_{16} \\ H_{21} & H_{22} & H_{23} & F_{24} & F_{25} & H_{26} \\ H_{31} & H_{32} & H_{33} & F_{34} & F_{35} & H_{36} \\ H_{41} & H_{42} & H_{43} & H_{44} & F_{45} & F_{46} \\ H_{51} & F_{52} & H_{53} & F_{54} & H_{55} & H_{56} \\ F_{61} & H_{62} & F_{63} & H_{64} & H_{65} & H_{66} \end{bmatrix}.$$

In some embodiments, when the terminal device sends the first information to the network device, identification information of the terminal device is carried, so that the terminal device determines, based on the identification information, the terminal device corresponding to the first information.

The identification information of the terminal device may be information used to identify the terminal device, such as an ID, an IP address, or a MAC address of the terminal device. This is not limited.

In some embodiments, the network device determines, based on signal strength of reference signals corresponding to the terminal device, a reference signal corresponding to each channel element in the first information, and then determine a coupling loss corresponding to each channel element in the first information.

For example, when sending the first information to the network device, the terminal device may sequentially add, to the first information, channel elements in descending order or in ascending order of the signal strength of the reference signals corresponding to the terminal device, so that the network device sequentially determines, based on the signal strength of the reference signals, coupling losses corresponding to the channel elements.

For example, the signal strength of the reference signals is the reference signal 2>the reference signal 4>the reference signal 1>the reference signal 3. The terminal device may sequentially add, to the first information, $H_{12}$, $H_{14}$, $H_{11}$, and $H_{13}$ in descending order of the signal strength of the reference signals, and send the first information to the network device. The network device may determine, based on the signal strength of the reference signals, the coupling loss $F_{12}$ corresponding to $H_{12}$ corresponding to the reference signal 2, determine the coupling loss $F_{14}$ corresponding to $H_{14}$ corresponding to the reference signal 4, determine the coupling loss $F_{11}$ corresponding to $H_{11}$ corresponding to the reference signal 1, and determine the coupling loss $F_{13}$ corresponding to $H_{13}$ corresponding to the reference signal 3; and then replaces the coupling loss with the corresponding channel element to obtain the second channel matrix.

Alternatively, when the location information of the terminal device that is determined by the network device based on beam sweeping is inaccurate, an element order of coupling losses in the first matrix determined by the network device may be inconsistent with an element order of the channel elements in the first information determined by the terminal device. The network device may use signaling to indicate that the terminal device needs to be feed back a location of a channel element in the first channel matrix. For example, a signaling format of the signaling may be:

csi-Channel Element ID Reporting ENUMERATED {True or False}

In some embodiments, when the signaling indicates true, the terminal device feeds back a location of each channel element in the first information or a time-frequency resource of a reference signal corresponding to each channel element. Because the time-frequency resource of the reference signal is in a one-to-one correspondence with the reference signal, and each channel element of the terminal device is in a one-to-one correspondence with the reference signal, the network device may determine, based on the feedback of the terminal device, a coupling loss that is in the first matrix and that corresponds to the channel element fed back by the terminal device.

Example 2: When each terminal device feeds back the first information to the network device in the manner 2, the network device may restore the channel element based on the channel parameter corresponding to the channel element included in the first information fed back by the terminal device, and determine a second channel matrix based on the first information and the first matrix with reference to the method described in the example 1. Details are not described again.

Example 3: When each terminal device feeds back the first information to the network device in the manner 3, the network device may restore the first channel element and each second channel element based on the first coefficient corresponding to each second channel element and the first channel element that are included in the first information fed back by the terminal device, and determine a second channel matrix based on the first information and the first matrix with reference to the method in the example 1. Details are not described again.

Example 4: When each terminal device feeds back the first information to the network device in the manner 4, the network device may restore the first channel element and the second channel elements based on the first coefficient corresponding to each second channel element and the channel parameter corresponding to the first channel element that are included in the first information fed back by the terminal device, and determine a second channel matrix based on the first information and the first matrix with reference to the method described in the example 1. Details are not described again.

In another possible design, when the terminal device feeds back the first information in the manner 5 to manner 7, the network device corrects, based on the first information, a coupling loss that is in the first matrix and that corresponds to the first information, to obtain a second channel matrix.

A reference signal corresponding to the first information is the same as a reference signal corresponding to the coupling loss corresponding to the first information, and a terminal device corresponding to the first information is the same as a terminal device corresponding to the coupling loss corresponding to the first information.

Example 5: When each terminal device feeds back the first information to the network device in the manner 5 or manner 6, the network device may multiply, based on the channel coefficient included in the first information fed back by the terminal device, the first coupling loss that is in the first matrix and that corresponds to the terminal device by the channel coefficient, to obtain a second channel matrix.

For example, the network device receives first information fed back by six terminal devices in the manner 5 or manner 6, first channel matrices corresponding to a terminal device 1 to a terminal device 6 are the following matrix H, and a first matrix determined by the network device based on the terminal device 1 to the terminal device 6 is the following matrix F. A channel element included in a first channel element corresponding to a terminal device i is a channel element in an $i^{th}$ row in the matrix H, and a coupling loss corresponding to the terminal device i is an element in an $i^{th}$ row in the matrix F. It is assumed that first information fed back by a terminal device 1 is $S_1\alpha_1$, first information fed back by a terminal device 2 is $S_2\alpha_2$, first information fed back by a terminal device 3 is $S_3\alpha_3$, first information fed back by a terminal device 4 is $S_4\alpha_4$, first information fed back by a terminal device 5 is $S_5\alpha_5$, and first information fed back by a terminal device 6 is $S_6\alpha_6$. After receiving the first information fed back by the terminal device 1 to the terminal device 6, the network device may multiply $S_1\alpha_1$ by $F_{11}$ to obtain $H_{11}, \ldots,$ and multiply $S_6\alpha_6$ by $F_{66}$ to obtain $H_{66}$, to determine a second channel matrix, which is the following matrix Hw:

$$H = \begin{bmatrix} H_{11} & H_{12} & H_{13} & H_{14} & H_{15} & H_{16} \\ H_{21} & H_{22} & H_{23} & H_{24} & H_{25} & H_{26} \\ H_{31} & H_{32} & H_{33} & H_{34} & H_{35} & H_{36} \\ H_{41} & H_{42} & H_{43} & H_{44} & H_{45} & H_{46} \\ H_{51} & H_{52} & H_{53} & H_{54} & H_{55} & H_{56} \\ H_{61} & H_{62} & H_{63} & H_{64} & H_{65} & H_{66} \end{bmatrix},$$

$$\text{and } F = \begin{bmatrix} F_{11} & F_{12} & F_{13} & F_{14} & F_{15} & F_{16} \\ F_{21} & F_{22} & F_{23} & F_{24} & F_{25} & F_{26} \\ F_{31} & F_{32} & F_{33} & F_{34} & F_{35} & F_{36} \\ F_{41} & F_{42} & F_{43} & F_{44} & F_{45} & F_{46} \\ F_{51} & F_{52} & F_{53} & F_{54} & F_{55} & F_{56} \\ F_{61} & F_{62} & F_{63} & F_{64} & F_{65} & F_{66} \end{bmatrix};$$

and $$Hw = \begin{bmatrix} H_{11} & H_{12} & H_{13} & H_{14} & F_{15} & F_{16} \\ H_{21} & H_{22} & H_{23} & F_{24} & F_{25} & H_{26} \\ H_{31} & H_{32} & H_{33} & F_{34} & F_{35} & H_{36} \\ H_{41} & H_{42} & H_{43} & H_{44} & F_{45} & F_{46} \\ H_{51} & F_{52} & H_{53} & F_{54} & H_{55} & H_{56} \\ F_{61} & H_{62} & F_{63} & H_{64} & H_{65} & H_{66} \end{bmatrix}.$$

Example 6: When each terminal device feeds back the first information to the network device in the manner 5 or manner 6, the network device may multiply, based on the channel coefficient included in the first information fed back by the terminal device, each coupling loss that is in the first matrix and that corresponds to the terminal device by the channel coefficient, to obtain a second channel matrix. Compared with the example 5, accuracy of the second channel matrix can be improved, thereby improving communications quality of a communications system.

For example, the network device receives first information fed back by six terminal devices in the manner 5 or manner 6, first channel matrices corresponding to a terminal device 1 to a terminal device 6 are the following matrix H, and a first matrix determined by the network device based on the terminal device 1 to the terminal device 6 is the following matrix F. A channel element included in a first channel element corresponding to a terminal device i is a channel element in an $i^{th}$ row in the matrix H, and a coupling loss corresponding to the terminal device i is an element in an $i^{th}$ row in the matrix F. It is assumed that first information fed back by a terminal device 1 is $S_1\alpha_1$, first information fed back by a terminal device 2 is $S_2\alpha_2$, first information fed back by a terminal device 3 is $S_3\alpha_3$, first information fed back by a terminal device 4 is $S_4\alpha_4$, first information fed back by a terminal device 5 is $S_5\alpha_5$, and first information fed back by a terminal device 6 is $S_6\alpha_6$. After receiving the first information fed back by the terminal device 1 to the terminal device 6, the network device may multiply $S_1\alpha_1$ by each coupling loss corresponding to the terminal device 1, . . . , and multiply $S_6\alpha_6$ by each coupling loss corresponding to the terminal device 6, to determine a second channel matrix, which is the following matrix Hw:

$$H = \begin{bmatrix} H_{11} & H_{12} & H_{13} & H_{14} & H_{15} & H_{16} \\ H_{21} & H_{22} & H_{23} & H_{24} & H_{25} & H_{26} \\ H_{31} & H_{32} & H_{33} & H_{34} & H_{35} & H_{36} \\ H_{41} & H_{42} & H_{43} & H_{44} & H_{45} & H_{46} \\ H_{51} & H_{52} & H_{53} & H_{54} & H_{55} & H_{56} \\ H_{61} & H_{62} & H_{63} & H_{64} & H_{65} & H_{66} \end{bmatrix},$$

$$\text{and } F = \begin{bmatrix} F_{11} & F_{12} & F_{13} & F_{14} & F_{15} & F_{16} \\ F_{21} & F_{22} & F_{23} & F_{24} & F_{25} & F_{26} \\ F_{31} & F_{32} & F_{33} & F_{34} & F_{35} & F_{36} \\ F_{41} & F_{42} & F_{43} & F_{44} & F_{45} & F_{46} \\ F_{51} & F_{52} & F_{53} & F_{54} & F_{55} & F_{56} \\ F_{61} & F_{62} & F_{63} & F_{64} & F_{65} & F_{66} \end{bmatrix};$$

and $$Hw = \begin{bmatrix} S_1\alpha_1 F_{11} & S_1\alpha_1 F_{12} & S_1\alpha_1 F_{13} & S_1\alpha_1 F_{14} & S_1\alpha_1 F_{15} & S_1\alpha_1 F_{16} \\ S_2\alpha_2 F_{21} & S_2\alpha_2 F_{22} & S_2\alpha_2 F_{23} & S_2\alpha_2 F_{24} & S_2\alpha_2 F_{25} & S_2\alpha_2 F_{26} \\ S_3\alpha_3 F_{31} & S_3\alpha_3 F_{32} & S_3\alpha_3 F_{33} & S_3\alpha_3 F_{34} & S_3\alpha_3 F_{35} & S_3\alpha_3 F_{36} \\ S_4\alpha_4 F_{41} & S_4\alpha_4 F_{42} & S_4\alpha_4 F_{43} & S_4\alpha_4 F_{44} & S_4\alpha_4 F_{45} & S_4\alpha_4 F_{46} \\ S_5\alpha_5 F_{51} & S_5\alpha_5 F_{52} & S_5\alpha_5 F_{53} & S_5\alpha_5 F_{54} & S_5\alpha_5 F_{55} & S_5\alpha_5 F_{56} \\ S_6\alpha_6 F_{61} & S_6\alpha_6 F_{62} & S_6\alpha_6 F_{63} & S_6\alpha_6 F_{64} & S_6\alpha_6 F_{65} & S_6\alpha_6 F_{66} \end{bmatrix}$$

Example 7: When each terminal device feeds back the first information to the network device in the manner 7, the network device may restore the channel coefficient based on the indication parameter of the channel coefficient included in the first information fed back by the terminal device, and determine a second channel matrix based on the first information and the first matrix with reference to the method in the example 5 or example 6. Details are not described again.

It should be noted that, in this embodiment of this application, when the channel coefficient corresponding to the terminal device approaches 1, the network device may directly determine the first matrix as the second channel matrix, and the terminal device does not need to feed back the first information, thereby reducing feedback overheads of the terminal device. That the channel coefficient approaches 1 may also be described as that a channel state of a channel corresponding to the terminal device approaches an ideal state. This is not limited.

Operation 405. The network device sends a downlink signal to the terminal device based on the second channel matrix.

In some embodiments, as shown in FIG. 5, operation 405 may be replaced with the following operation 405*a* and operation 405*b*.

Operation 405*a*: The network device determines a precoding matrix based on the second channel matrix.

In some embodiments, when the network device sends k reference signals to k terminal devices, a terminal device may receive the k reference signals. One reference signal is a wanted signal, and remaining reference signals are interfering signals. That is, a signal $R_i$ received by a terminal device i is:

$$R_i = H_i\left(W_i s_i + \sum_{k \neq i} W_k s_k\right), \text{ where}$$

$$W_k = \begin{bmatrix} H_1 \\ H_2 \\ \vdots \\ H_k \end{bmatrix}^+_{(:,k)}.$$

$H_i$ represents a first channel matrix corresponding to the terminal device i, $W_i$ represents a precoding matrix corresponding to the terminal device i, $s_i$ represents a wanted signal corresponding to the terminal device i, $W_k$ represents a transmit weight of a terminal device, and $s_k$ represents a wanted signal corresponding to the terminal device k.

For example, the network device may determine the precoding matrix based on the second channel matrix by using a minimum mean square error (MMSE) method. A noise factor is considered in communications system design, and corresponding processing is performed to minimize interference caused by noise, to minimize a mean square value of an error between a received signal and a sent signal, thereby improving reliability of a communications system. In addition, $H_i W_k$, $\forall i \neq k$ is minimized, to reduce interference between terminal devices, thereby improving communications quality.

For example, the network device may determine the precoding matrix $W_{MMSE}$ based on the second channel matrix according to the following formula:

$$W_{MMSE} = \beta_{mmse} F_{MMSE}, \text{ where}$$

$$F_{MMSE} = H^H \left(HH^H + \frac{k\sigma^2}{P_{total}} I_k\right)^{-1}; \text{ and}$$

$$\beta_{mmse} = \sqrt{\frac{P_{total}}{\text{trace}(F_{MMSE} F_{MMSE}^H)}}.$$

H represents the second channel matrix, $H^H$ represents a conjugate matrix of the second channel matrix, k represents a quantity of terminal devices, $\sigma^2$ represents noise power, $P_{total}$ represents total transmit power, and $I_k$ represents an identity matrix.

Operation 405*b*. The network device sends the downlink signal to the terminal device based on the precoding matrix.

In some embodiments, when the network device needs to send a downlink signal to the terminal device, the network device may perform precoding processing on the downlink signal based on the precoding matrix, and send the downlink signal to the terminal device, to reduce interference between terminal devices and improve communications quality of a communications system.

Figure 7:
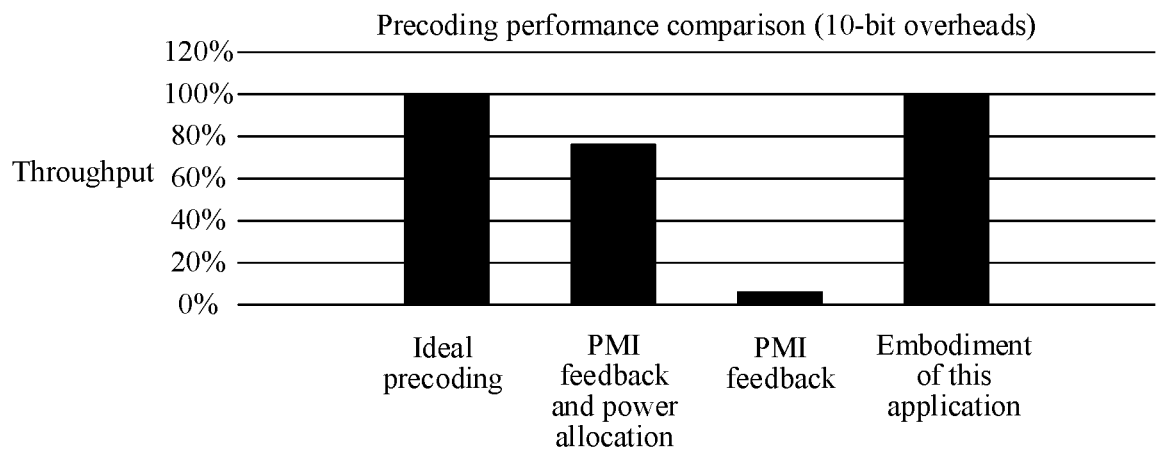
FIG. 7 is a diagram of throughputs corresponding to precoding technologies according to an embodiment of this application.

Based on the method shown in FIG. 4, for a long-distance communications scenario, with reference to FIG. 7, for example, feedback overheads of a terminal device are 10-bit overheads, and a throughput obtained by using ideal precoding is 100%. It can be learned that a throughput corresponding to a method of PMI feedback and power allocation is approximately 78%, a throughput corresponding to a method of PMI feedback is approximately 8%, while a throughput obtained by using the method in this embodiment of this application may reach 100%, which greatly improves communications performance of a communications system.

Based on the method shown in FIG. 4, the terminal device feeds back limited channel elements by using the first information, so that the network device processes the first matrix based on the limited channel elements to obtain the second channel matrix, and feedback overheads can be reduced. In addition, because the network device determines the second channel matrix based on the channel elements fed back by the terminal device, an error between an actual beam direction and an ideal beam direction can be reduced, beam sweeping precision can be improved, and communications quality of long-distance communication can be improved.

The foregoing mainly describes solutions provided in embodiments of this application from a perspective of interaction between devices. It may be understood that, to implement the foregoing functions, the devices include hardware structures and/or software modules corresponding to the functions. A person of ordinary skill in the art should easily be aware that, in combination with algorithm operations in the examples described in the embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In embodiments of this application, each device may be divided into function modules based on the foregoing method example. For example, the function modules may be divided corresponding to the functions, or two or more functions may be integrated into one processing module. The integrated module may be implemented in a form of hardware, or may be implemented in a form of a software function module. It should be noted that, division of the modules in embodiments of this application is an example, and is merely division of logical functions. During actual implementation, another division manner may be used.

Figure 8:
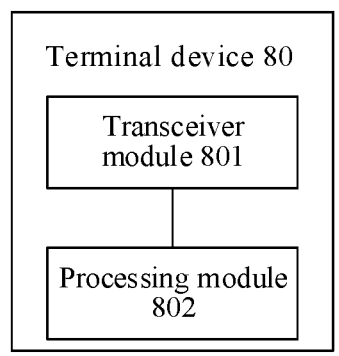
FIG. 8 is a diagram of composition of a terminal device according to an embodiment of this application.

When each function module is obtained through division corresponding to each function, FIG. 8 shows a terminal device. The terminal device 80 may include a transceiver module 801 and a processing module 802. For example, the terminal device 80 may be a terminal device, or may be a chip applied to the terminal device, or another integrated component, part, or the like that has a function of the terminal device. When the terminal device 80 is a terminal device, the transceiver module 801 may be a transceiver, the transceiver may include an antenna, a radio frequency circuit, and the like, and the processing module 802 may be a processor (or a processing circuit), for example, a baseband processor. The baseband processor may include one or more CPUs. When the terminal device 80 is a part that has a function of the terminal device, the transceiver module 801 may be a radio frequency unit, and the processing module 802 may be a processor (or a processing circuit), for example, a baseband processor. When the terminal device 80 is a chip system, the transceiver module 801 may be an input/output interface of a chip (for example, a baseband chip), and the processing module 802 may be a processor (or a processing circuit) of the chip system, and may include one or more central processing units. It should be understood that the transceiver module 801 in this embodiment of this application may be implemented by a transceiver or a transceiver-related circuit component, and the processing module 802 may be implemented by a processor or a processor-related circuit component (or referred to as a processing circuit).

For example, the transceiver module 801 may be configured to perform all receiving and sending operations performed by the terminal device in the embodiments shown in FIG. 4 to FIG. 7, and/or configured to support another process of the technology described in this specification. The processing module 802 may be configured to perform all operations performed by the terminal device in the embodiments shown in FIG. 4 to FIG. 7 except the receiving and sending operations, and/or configured to support another process of the technology described in this specification.

The transceiver module 801 is configured to obtain a plurality of reference signals. The processing module 802 is configured to determine a first channel matrix based on the plurality of reference signals. The transceiver module 801 is further configured to feed back, to a network device, first information indicating some channel elements in the first channel matrix. The transceiver module 801 is further configured to receive a downlink signal determined based on the first information and sent by the network device. A channel element in the some channel elements is determined based on signal strength and/or a time-frequency resource of the reference signal.

In a possible design, the some channel elements include a first channel element corresponding to a first reference signal, and the first reference signal is a reference signal with maximum signal strength in the plurality of reference signals, or the first reference signal is a reference signal on a preset time-frequency resource.

In a possible design, the first information includes the some channel elements.

In a possible design, the first information includes a channel parameter corresponding to each of the some channel elements, so that the network device determines, based on the channel parameter, the channel element corresponding to the channel parameter.

In a possible design, the first information includes a first coefficient corresponding to each second channel element and the first channel element, so that the network device determines, based on the first coefficient and the first channel element, the second channel element corresponding to the first coefficient.

In a possible design, the first information includes a first coefficient corresponding to each second channel element and a channel parameter of the first channel element, so that the network device determines the first channel element based on the channel parameter of the first channel element, and determines, based on the first coefficient and the first channel element, the second channel element corresponding to the first coefficient.

In a possible design, the first information includes a channel coefficient, or the first information includes an indication parameter corresponding to the channel coefficient, so that the network device determines the second channel matrix based on the channel coefficient.

In a possible design, the channel coefficient is a quotient of the first channel element and a first coupling loss corresponding to the first channel element, and the first coupling loss corresponds to the first reference signal.

In a possible design, the channel coefficient is an average value of quotients of channel elements in the first channel matrix and coupling losses corresponding to the channel elements, and the channel element and the coupling loss corresponding to the channel element correspond to a same reference signal.

In a possible design, the transceiver module 801 is further configured to feed back the first information to the network device in a feedback manner indicated by first indication information sent by the network device. The feedback manner includes one or more of the following: feeding back the first information based on a channel element, feeding back the first information based on a channel parameter of a channel element, feeding back the first information based on a channel element and a first coefficient, feeding back the first information based on a channel parameter of a channel element and a first coefficient, feeding back the first information based on a channel coefficient, or feeding back the first information based on an indication parameter of a channel coefficient.

In a possible design, the transceiver module 801 is further configured to: determine the some channel elements based on the first channel matrix and a quantity of channel elements included in the some channel elements that is indicated by second indication information sent by the network device, and feed back the first information to the network device based on the some channel elements.

In a possible design, the transceiver module 801 is further configured to send location information of the terminal device to the network device.

In a possible design, the processing module 802 is further configured to determine, based on beam sweeping, a first beam with maximum signal strength in beams corresponding to the beam sweeping; and the transceiver module 801 is further configured to send related information of the first beam to the network device, so that the terminal device and the network device determine the location information of the terminal device based on the first beam.

In a possible design, the related information of the first beam is one or more of the following: a beam identifier of the first beam, a timestamp of the first beam, and a time-frequency resource of the first beam.

In another possible implementable manner, the transceiver module 801 in FIG. 8 may be replaced with a transceiver, and the transceiver may integrate a function of the transceiver module 801. The processing module 802 may be replaced with a processor, and the processor may integrate a function of the processing module 802. Further, the terminal device 80 shown in FIG. 8 may further include a memory. When the transceiver module 801 is replaced with a transceiver, and the processing module 802 is replaced with a processor, the terminal device 80 in this embodiment of this application may be the communications apparatus shown in FIG. 2.

Figure 9:
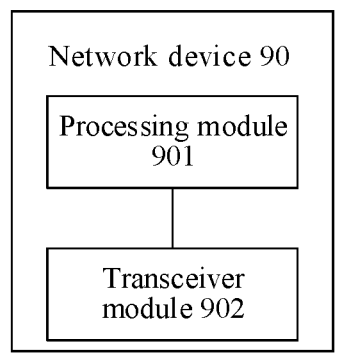
FIG. 9 is a diagram of composition of a network device according to an embodiment of this application.

When each function module is obtained through division corresponding to each function, FIG. 9 shows a network device. The network device 90 may include a processing module 901 and a transceiver module 902. For example, the network device 90 may be a network device, or may be a chip applied to the network device, or another integrated component, part, or the like that has a function of the network device. When the network device 90 is a network device, the transceiver module 902 may be a transceiver, the transceiver may include an antenna, a radio frequency circuit, and the like, and the processing module 901 may be a processor (or a processing circuit), for example, a baseband processor. The baseband processor may include one or more CPUs. When the network device 90 is a part that has a function of the network device, the transceiver module 902 may be a radio frequency unit, and the processing module 901 may be a processor (or a processing circuit), for example, a baseband processor. When the network device 90 is a chip system, the transceiver module 902 may be an input/output interface of a chip (for example, a baseband chip), and the processing module 901 may be a processor (or a processing circuit) of the chip system, and may include one or more central processing units. It should be understood that the transceiver module 902 in this embodiment of this application may be implemented by a transceiver or a transceiver-related circuit component, and the processing module 901 may be implemented by a processor or a processor-related circuit component (or referred to as a processing circuit).

For example, the processing module 901 may be configured to perform all operations performed by the network device in the embodiments shown in FIG. 4 to FIG. 7 except receiving and sending operations, and/or configured to support another process of the technology described in this specification. The transceiver module 902 may be configured to perform all receiving and sending operations performed by the network device in the embodiments shown in FIG. 4 to FIG. 7, and/or configured to support another process of the technology described in this specification.

The processing module 901 is configured to determine a first matrix of k*k. The transceiver module 902 is configured to receive first information fed back by m terminal devices. The processing module 901 is further configured to process the first matrix based on the first information to obtain a second channel matrix. The transceiver module 902 is configured to send a downlink signal to the terminal device based on the second channel matrix. An $(ij)^{th}$ element in the first matrix indicates a coupling loss of a terminal device i corresponding to a reference signal j, $1 \leq i \leq k$, and $1 \leq j \leq k$; or the $(ij)^{th}$ element in the first matrix indicates a coupling loss of a reference signal i corresponding to a terminal device j, $1 \leq i \leq k$, and $1 \leq j \leq k$. The first information indicates some channel elements of a first channel matrix of a terminal device corresponding to the first information, the first channel matrix includes a channel element corresponding to the reference signal, a channel element in the some channel elements is determined based on signal strength and/or a time-frequency resource of the reference signal, and $1 \leq m \leq k$.

In a possible design, the processing module 901 is further configured to determine the first matrix based on location information of the network device, location information of k terminal devices, and k reference signals.

In a possible design, the transceiver module 902 is further configured to receive location information from the terminal device.

In a possible design, the processing module 901 is further configured to determine the location information of the terminal device based on beam sweeping.

In a possible design, the transceiver module 902 is further configured to send first indication information to the terminal device, so that the terminal device feeds back the first information in a feedback manner indicated by the first indication information. The feedback manner includes one or more of the following: feeding back the first information based on a channel element, feeding back the first information based on a channel parameter of a channel element, feeding back the first information based on a channel element and a first coefficient, feeding back the first information based on a channel parameter of a channel element and a first coefficient, feeding back the first information based on a channel coefficient, or feeding back the first information based on an indication parameter of a channel coefficient.

In a possible design, the transceiver module 902 is further configured to send second indication information to the terminal device, so that the terminal device determines the some channel elements based on a quantity of channel elements included in the some channel elements that is indicated by the second indication information, and feeds back the first information.

In a possible design, the processing module 901 is further configured to: determine, based on the first information, a channel element corresponding to each piece of first information; and replace, based on a terminal device corresponding to each channel element and a reference signal corresponding to the channel element, a coupling loss that is in the first matrix and that corresponds to the terminal device and the reference signal with the channel element, to obtain the second channel matrix.

In a possible design, the processing module 901 is further configured to correct, based on the first information, a coupling loss that is in the first matrix and that corresponds to the first information, to obtain the second channel matrix. A reference signal corresponding to the first information is the same as a reference signal corresponding to the coupling loss corresponding to the first information, and a terminal device corresponding to the first information is the same as a terminal device corresponding to the coupling loss corresponding to the first information.

In another implementable manner, the processing module 901 in FIG. 9 may be replaced with a processor, and the processor may integrate a function of the processing module 901. The transceiver module 902 may be replaced with a transceiver, and the transceiver may integrate a function of the transceiver module 902. Further, the network device 90 shown in FIG. 9 may further include a memory. When the processing module 901 is replaced with a processor, and the transceiver module 902 is replaced with a transceiver, the network device 90 in this embodiment of this application may be the communications apparatus shown in FIG. 2.

An embodiment of this application further provides a computer-readable storage medium. All or some of the processes in the foregoing method embodiments may be implemented by a computer program instructing related hardware. The program may be stored in the computer-readable storage medium. When the program is executed, the processes of the foregoing method embodiments may be included. The computer-readable storage medium may be an internal storage unit of the terminal (including a data sending end and/or a data receiving end) in any one of the foregoing embodiments, for example, a hard disk drive or an internal memory of the terminal. Alternatively, the computer-readable storage medium may be an external storage device of the terminal, for example, a plug-in hard disk, a smart media card (SMC), a secure digital (SD) card, a flash card, or the like disposed on the terminal. Further, alternatively, the computer-readable storage medium may include both the internal storage unit of the terminal and the external storage device. The computer-readable storage medium is configured to store the computer program and other programs and data that are required by the terminal. The computer-readable storage medium may be further configured to temporarily store data that has been output or that is to be output.

It should be noted that, in the specification, claims, and accompanying drawings of this application, the terms "first", "second", and the like are intended to distinguish between different objects but do not indicate a particular order. In addition, the terms "including", "having", or any other variant thereof are intended to cover a non-exclusive inclusion. For example, a process, a method, a system, a product, or a device that includes a series of operations or units is not limited to the listed operations or units, but in some embodiments further includes unlisted operations or units, or further includes other inherent operations or units of the process, the method, the product, or the device.

It should be understood that, in this application, "at least one (item)" means one or more, "a plurality of" means two or more, "at least two (items)" means two, three, or more, and "and/or" is used to describe an association relationship between associated objects, and indicates that there may be three relationships. For example, "A and/or B" may indicate that only A exists, only B exists, and both A and B exist, where A and B may be singular or plural. The character "/" generally indicates an "or" relationship between associated objects. The expression "at least one of the following items (pieces)" or a similar expression means any combination of these items, including a single item (piece) or any combination of a plurality of items (pieces). For example, at least one of a, b, or c may indicate a, b, c, a and b, a and c, b and c, or a, b, and c, where a, b, and c may be singular or plural.

From the foregoing description about implementations, a person skilled in the art can clearly understand that, for the purpose of convenient and brief description, only division of the foregoing function modules is used as an example for illustration. In an actual application, the foregoing functions can be allocated to different modules and implemented as required. In other words, an internal structure of an apparatus is divided into different function modules to implement all or some of the functions described above.

In the several embodiments provided in this application, it should be understood that the disclosed apparatus and method may be implemented in other manners. For example, the described apparatus embodiment is merely an example. For example, the module or division into the units is merely logical function division and may be other division in actual implementation. For example, a plurality of units or components may be combined or integrated into another apparatus, or some features may be ignored or not performed. In addition, the displayed or discussed mutual couplings or direct couplings or communications connections may be implemented through some interfaces. The indirect couplings or communications connections between the apparatuses or units may be implemented in electronic, mechanical, or other forms.

The units described as separate parts may or may not be physically separate, and parts displayed as units may be one or more physical units, may be located in one place, or may be distributed on different places. Some or all of the units may be selected based on actual requirements to achieve the objectives of the solutions of embodiments.

In addition, function units in embodiments of this application may be integrated into one processing unit, each of the units may exist independently physically, or two or more units may be integrated into one unit. The integrated unit may be implemented in a form of hardware, or may be implemented in a form of a software function unit.

When the integrated unit is implemented in the form of a software function unit and sold or used as an independent product, the integrated unit may be stored in a readable storage medium. Based on such an understanding, the technical solutions of this application essentially, or a part contributing to a conventional technology, or all or some of the technical solutions may be implemented in the form of a software product. The software product is stored in a storage medium and includes several instructions for instructing a device (which may be a single-chip microcomputer, a chip, or the like) or a processor (processor) to perform all or some of the operations of the methods described in embodiments of this application. The storage

What is claimed is:

1. A channel matrix determining method comprising:
obtaining, by a terminal device, a plurality of reference signals;
feeding back, by the terminal device, first information to a network device, wherein the first information indicates a plurality of channel elements in a first channel matrix, the first channel matrix comprises a channel element corresponding to a reference signal of the plurality of reference signals, and a channel element in the plurality of channel elements is determined based on signal strength or a time-frequency resource of the reference signal; and
receiving, by the terminal device, a downlink signal from the network device, wherein the downlink signal is a signal determined by the network device based on the first information;
wherein the plurality of channel elements comprise a first channel element corresponding to a first reference signal that is a reference signal with a maximum signal strength in the plurality of reference signals, or is a reference signal on a preset time-frequency resource;
wherein the first information comprises:
a channel coefficient that is a quotient of the first channel element and a first coupling loss corresponding to the first channel element, wherein the first coupling loss corresponds to the first reference signal; or the channel coefficient is an average value of quotients of channel elements in the first channel matrix and coupling losses corresponding to the channel elements, wherein reference signals corresponding to the channel elements are the same as reference signals corresponding to the coupling losses corresponding to the channel elements; or
an indication parameter corresponding to the channel coefficient, wherein the indication parameter is used to determine the channel coefficient, the channel coefficient is the quotient of the first channel element and the first coupling loss corresponding to the first channel element, and the first coupling loss corresponds to the first reference signal; or the channel coefficient is the average value of quotients of channel elements in the first channel matrix and the coupling losses corresponding to the channel elements, and the reference signals corresponding to the channel elements are the same as the reference signals corresponding to the coupling losses corresponding to the channel elements.

2. The method according to claim 1, wherein in response to the plurality of channel elements comprising the first channel element and at least one second channel element,
the first information comprises a first coefficient corresponding to each second channel element and the first channel element, and the first coefficient is used to determine, based on the first channel element, the second channel element corresponding to the first coefficient; or
the first information comprises a first coefficient corresponding to each second channel element and a channel parameter of the first channel element, the channel parameter of the first channel element is used to determine the first channel element, and the first coefficient is used to determine, based on the first channel element, the second channel element corresponding to the first coefficient.

3. The method according to claim 1, wherein feeding back the first information to the network device comprises:
receiving, by the terminal device, first indication information from the network device, wherein the first indication information indicates a feedback manner in which the terminal device feeds back the first information, and the feedback manner comprises one or more of the following: feeding back the first information based on a channel element, feeding back the first information based on a channel parameter of a channel element, feeding back the first information based on a channel element and a first coefficient, feeding back the first information based on a channel parameter of a channel element and a first coefficient, feeding back the first information based on a channel coefficient, or feeding back the first information based on an indication parameter of a channel coefficient; and
feeding back, by the terminal device, the first information to the network device based on the first indication information.

4. The method according to claim 1, wherein feeding back the first information to the network device further comprises:
receiving, by the terminal device, second indication information from the network device, wherein the second indication information indicates a quantity of channel elements comprised in the some channel elements; and
feeding back, by the terminal device, the first information to the network device based on the second indication information.

5. The method according to claim 1, wherein the method further comprises:
sending, by the terminal device, location information of the terminal device to the network device; and
determining, by the terminal device, a first beam based on beam sweeping, and sending related information of the first beam to the network device, wherein the first beam is a beam with maximum signal strength in beams corresponding to the beam sweeping, and the related information of the first beam is one or more of the following: a beam identifier of the first beam, a timestamp of the first beam, and a time-frequency resource of the first beam.

6. A terminal device comprising:
a transceiver module configured to obtain a plurality of reference signals, wherein
the transceiver module is further configured to feed back first information to a network device, wherein the first information indicates a plurality of channel elements in a first channel matrix, the first channel matrix comprises a channel element corresponding to a reference signal of the plurality of reference signals, and a channel element in the plurality of channel elements is determined based on signal strength or a time-frequency resource of the reference signal; and
the transceiver module is further configured to receive a downlink signal from the network device, wherein the downlink signal is a signal determined by the network device based on the first information;
wherein the plurality of channel elements comprise a first channel element corresponding to a first reference signal that is a reference signal with a maximum signal strength in the plurality of reference signals, or is a reference signal on a preset time-frequency resource;

wherein the first information comprises:
- a channel coefficient that is a quotient of the first channel element and a first coupling loss corresponding to the first channel element, wherein the first coupling loss corresponds to the first reference signal; or the channel coefficient is an average value of quotients of channel elements in the first channel matrix and coupling losses corresponding to the channel elements, wherein reference signals corresponding to the channel elements are the same as reference signals corresponding to the coupling losses corresponding to the channel elements; or
- an indication parameter corresponding to the channel coefficient, wherein the indication parameter is used to determine the channel coefficient, the channel coefficient is the quotient of the first channel element and the first coupling loss corresponding to the first channel element, and the first coupling loss corresponds to the first reference signal; or the channel coefficient is the average value of quotients of channel elements in the first channel matrix and the coupling losses corresponding to the channel elements, and the reference signals corresponding to the channel elements are the same as the reference signals corresponding to the coupling losses corresponding to the channel elements.

7. The terminal device according to claim 6, wherein in response to the plurality of channel elements comprise the first channel element and at least one second channel element,
- the first information comprises a first coefficient corresponding to each second channel element and the first channel element, and the first coefficient is used to determine, based on the first channel element, the second channel element corresponding to the first coefficient; or
- the first information comprises a first coefficient corresponding to each second channel element and a channel parameter of the first channel element, the channel parameter of the first channel element is used to determine the first channel element, and the first coefficient is used to determine, based on the first channel element, the second channel element corresponding to the first coefficient.

8. The terminal device according to claim 6, wherein the transceiver module is configured to receive first indication information from the network device, wherein the first indication information indicates a feedback manner in which the terminal device feeds back the first information, and the feedback manner comprises one or more of the following: feeding back the first information based on a channel element, feeding back the first information based on a channel parameter of a channel element, feeding back the first information based on a channel element and a first coefficient, feeding back the first information based on a channel parameter of a channel element and a first coefficient, feeding back the first information based on a channel coefficient, or feeding back the first information based on an indication parameter of a channel coefficient; and the transceiver module is further configured to feed back the first information to the network device based on the first indication information.

9. The terminal device according to claim 6, wherein
the transceiver module is further configured to receive second indication information from the network device, wherein the second indication information indicates a quantity of channel elements comprised in the plurality of channel elements; and
the transceiver module is further configured to feed back the first information to the network device based on the second indication information.

10. The terminal device according to claim 6, wherein
the transceiver module is further configured to send location information of the terminal device to the network device; or
a processing module configured to determine a first beam based on beam sweeping, wherein the transceiver module is further configured to send related information of the first beam to the network device, wherein the first beam is a beam with maximum signal strength in beams corresponding to the beam sweeping, and the related information of the first beam is one or more of the following: a beam identifier of the first beam, a timestamp of the first beam, and a time-frequency resource of the first beam.

11. A network device, comprising:
a processing device configured to determine a first matrix that is a k*k matrix; and an $(ij)^{th}$ element in the first matrix indicates a coupling loss of a terminal device i corresponding to a reference signal j, $1 \leq i \leq k$, and $1 \leq j \leq k$; or the $(ij)^{th}$ element in the first matrix indicates a coupling loss of a reference signal i relative to a terminal device j, $1 \leq i \leq k$, and $1 \leq j \leq k$; and
a transceiver configured to receive first information fed back by m terminal devices, wherein the first information indicates a plurality of channel elements of a first channel matrix of a terminal device corresponding to the first information, the first channel matrix comprises a channel element corresponding to the reference signal, a channel element in the plurality of channel elements is determined based on signal strength and a time-frequency resource of the reference signal, and $1 \leq m \leq k$;
wherein:
the processing device is further configured to process the first matrix based on the first information to obtain a second channel matrix corresponding to the network device, and determine the first matrix based on location information of the network device, location information of k terminal devices, and k reference signals; and
the transceiver is further configured to send a downlink signal to the terminal device based on the second channel matrix.

* * * * *